US012613128B2

(12) United States Patent
Pasandi et al.

(10) Patent No.: US 12,613,128 B2
(45) Date of Patent: Apr. 28, 2026

(54) ENHANCED DISTURBANCE MONITORING AND LOCALIZATION ENABLED BY DIGITAL SIGNAL PROCESSING (DSP)-BASED LASER PHASE NOISE ESTIMATION

(71) Applicant: CIENA CORPORATION, Hanover, MD (US)

(72) Inventors: Mohammad Ebrahim Mousa Pasandi, Nepean (CA); Maurice O'Sullivan, Ottawa (CA); Michael Reimer, Stittsville (CA); Yixiang Hu, Montreal (CA); David V. Plant, Montreal (CA); Ramon Gutierrez-Castrejon, Montreal (CA)

(73) Assignee: CIENA CORPORATION, Hanover, MD (US)

( * ) Notice: Subject to any disclaimer, the term of this patent is extended or adjusted under 35 U.S.C. 154(b) by 284 days.

(21) Appl. No.: 18/491,309

(22) Filed: Oct. 20, 2023

(65) Prior Publication Data

US 2025/0130095 A1 Apr. 24, 2025

(51) Int. Cl.
*G01H 9/00* (2006.01)
*H04B 10/07* (2013.01)

(52) U.S. Cl.
CPC ............. *G01H 9/004* (2013.01); *H04B 10/07* (2013.01)

(58) Field of Classification Search
None
See application file for complete search history.

(56) References Cited

U.S. PATENT DOCUMENTS

2006/0103850 A1* 5/2006 Alphonse ............. A61B 5/0066
356/479
2022/0236083 A1 7/2022 Ip et al.

OTHER PUBLICATIONS

Wu Qiong et al: "Training Symbol Assisted in-Band OSNR Monitoring Technique for PDM-CO-OFDM System", Journal of Lightwave Technology, IEEE, USA, vol. 35, No. 9, May 1, 2017 (May 1, 2017), pp. 1551-1556, XP011646506, ISSN: 0733-8724, [retrieved on Apr. 19, 2017], DOI: 10.1109/JLT.2017.2664107 * (Year: 2017).*
"Corning SMF-238e Optical Fiber Product Information", www.corning.com/opticalfiber, Jul. 2014, 2 Pages.
"Optical Network Sensing", McGill University, May 10, 2022, 13 Pages.

(Continued)

*Primary Examiner* — Eric S. McCall
*Assistant Examiner* — Nigel H Plumb
(74) *Attorney, Agent, or Firm* — Guntin & Gust, PLC; Kenneth S. Kwan

(57) ABSTRACT

Aspects of the subject disclosure may include, for example, deriving substantially orthogonal optical fields from an output of an optical source, implementing a delay on one of the substantially orthogonal optical fields, resulting in time delayed optical fields, performing coherent detection of the time-delayed optical fields, resolving electrical field signals based on the coherent detection, and causing the electrical field signals to be processed so as to estimate a property of the optical source, wherein estimation of the property facilitates disturbance detection and localization. Other embodiments are disclosed.

22 Claims, 32 Drawing Sheets

(56) References Cited

OTHER PUBLICATIONS

"Optical system performance measurements", https://doi.org/10.1016/B978-0-323-90957-0.00003-5, Jan. 27, 2023, 141 Pages.

Cantono, Mattia , et al., "Sub-Hertz Spectral Analysis of Polarization of Light in a Transcontinental Submarine Cable", 2020 European Conference on Optical Communications (ECOC) | 978-1-7281-7361-0/20/$31.00 © 2020 IEEE | DOI: 10.1109/ECOC48923.2020.9333176, 2020, 3 Pages.

Charlton, Douglas , et al., "Field measurements of SOP transients in OPGW, with time and location correlation to lightning strikes", vol. 25, No. 9 | May 1, 2017 | Optics Express 9689, May 1, 2017, 8 Pages.

Guerrier, Sterenn , et al., "Vibration Detection and Localization in Buried Fiber Cable after 80km of SSMF using Digital Coherent Sensing System with Co-Propagating 600Gb/s WDM Channels", OFC 2022 © Optica Publishing Group 2022, 2022, 3 Pages.

He, Haijun , et al., "Integrated sensing and communication in an optical fibre", He et al. Light: Science & Applications ( 2023) 12:25 Official journal of the CIOMP 2047-7538 https://doi.org/10.1038/s41377-022-01067-1 www.nature.com/lsa, Jan. 17, 2023, 14 Pages.

He, Zuyuan , et al., "Optical Fiber Distributed Acoustic Sensors: A Review", Journal of Lightwave Technology, vol. 39, No. 12, Jun. 15, 2021, 16 Pages.

Ip, Ezra, et al., "DAS Over 1,007-km Hybrid Link With 10-Tb/s DP-16QAM Co-Propagation Using Frequency-Diverse Chirped Pulses", Journal of Lightwave Technology, vol. 41, No. 4, Feb. 15, 2023, 10 Pages.

Ip, Ezra , et al., "Vibration Detection and Localization Using Modified Digital Coherent Telecom Transponders", Journal of Lightwave Technology, vol. 40, No. 5, Mar. 1, 2022, 11 Pages.

Kakkar, Aditya, et al., "Comprehensive Study of Equalization-Enhanced Phase Noise in Coherent Optical Systems", Journal of Lightwave Technology, vol. 33, No. 23, Dec. 1, 2015, 8 Pages.

Luch, Ilaria Di, et al., "Vibration Sensing for Deployed Metropolitan Fiber Infrastructure", Journal of Lightwave Technology, vol. 39, No. 4, Feb. 15, 2021, 8 Pages.

Magarini, Maurizio , et al., "Pilot-Symbols-Aided Carrier-Phase Recovery for 100-G PM-QPSK Digital Coherent Receivers", IEEE Photonics Technology Letters, vol. 24, No. 9, May 1, 2012, 3 Pages.

Ming-Fang, Huang , et al., "First Field Trial of Distributed Fiber Optical Sensing and High-Speed Communication Over an Operational Telecom Network", Journal of Lightwave Technology, vol. 38, No. 1,, Jan. 1, 2020, 7 Pages.

Shang, Ying , et al., "Research Progress in Distributed Acoustic Sensing Techniques", Sensors 2022, 22, 6060, 2022, 31 Pages.

Simsarian, Jesse E., et al., "Shake Before Break: Per-Span Fiber Sensing with In-Line Polarization Monitoring", 978-1-943580--23-1/17/$31.00 © 2017 Optical Society of America, 2017, 3 Pages.

Tong, Yitian , et al., "Ultrafast optical phase-sensitive ultrasonic detection via dual-comb multiheterodyne interferometry", https://www.spiedigitallibrary.org/journals/Advanced-Photonics-Nexus, Jan. 2023, 12 Pages.

Wellbrock, G. A. , et al., "Field Trial of Vibration Detection and Localization using Coherent Telecom Transponders over 380-km Link", OFC 2021 © OSA 2021, 2021, 3 Pages.

Yan, Yaxi , et al., "Forward Transmission Based Ultra-Long Distributed Vibration Sensing With Wide Frequency Response", Journal of Lightwave Technology, vol. 39, No. 7, Apr. 1, 2021, 9 Pages.

Yan, Yaxi , et al., "Simultaneous communications and vibration sensing over a single 100-km deployed fiber link by fiber interferometry", OFC 2023 © Optica Publishing Group 2023, Sep. 18, 2023, 3 Pages.

Yang, Jiaqian , et al., "Joint estimation of dynamic polarization and carrier phase with pilot-based adaptive equalizer in PDM-64 QAM transmission system", vol. 29, No. 26 / Dec. 20, 2021 / Optics Express 43136, Dec. 20, 2021, 12 Pages.

Zhan, Zhongwen , et al., "Optical polarization-based seismic and water wave sensing on transoceanic cables", Science 371, 931-936 (2021), Feb. 26, 2023, 6 Pages.

"International Search Report and Written Opinion received for PCT Application Serial No. PCT/U82024/051201", Feb. 7, 2025, 13 Pages.

Li, et al., "Channel Equalization in Optical OFDM Systems Using Inde1Jendent Component Analysis", Journal of Lightwave Technology, vol. 32, No. 18,, Sep. 15, 2014, 9 Pages.

Wu, et al., "Training Syn1bol Assisted in-Band OSNR Monitoring Technique for PDM-CO-OFDM Systen1", Journal of Lightwave Technology, vol. 35, No. 9, May 1, 2017, 6 Pages.

Xiao, et al., "Polarization Fading Suppression for Optical Fiber Sensing: A Review", IEEE Sensors Journal, vol. 22, No. 9, https://www.ieee.org/publications/rights/index.html, May 1, 2022, 18 Pages.

* cited by examiner

300

400

410

420

430

440

450

460

470

480

Figure 5:
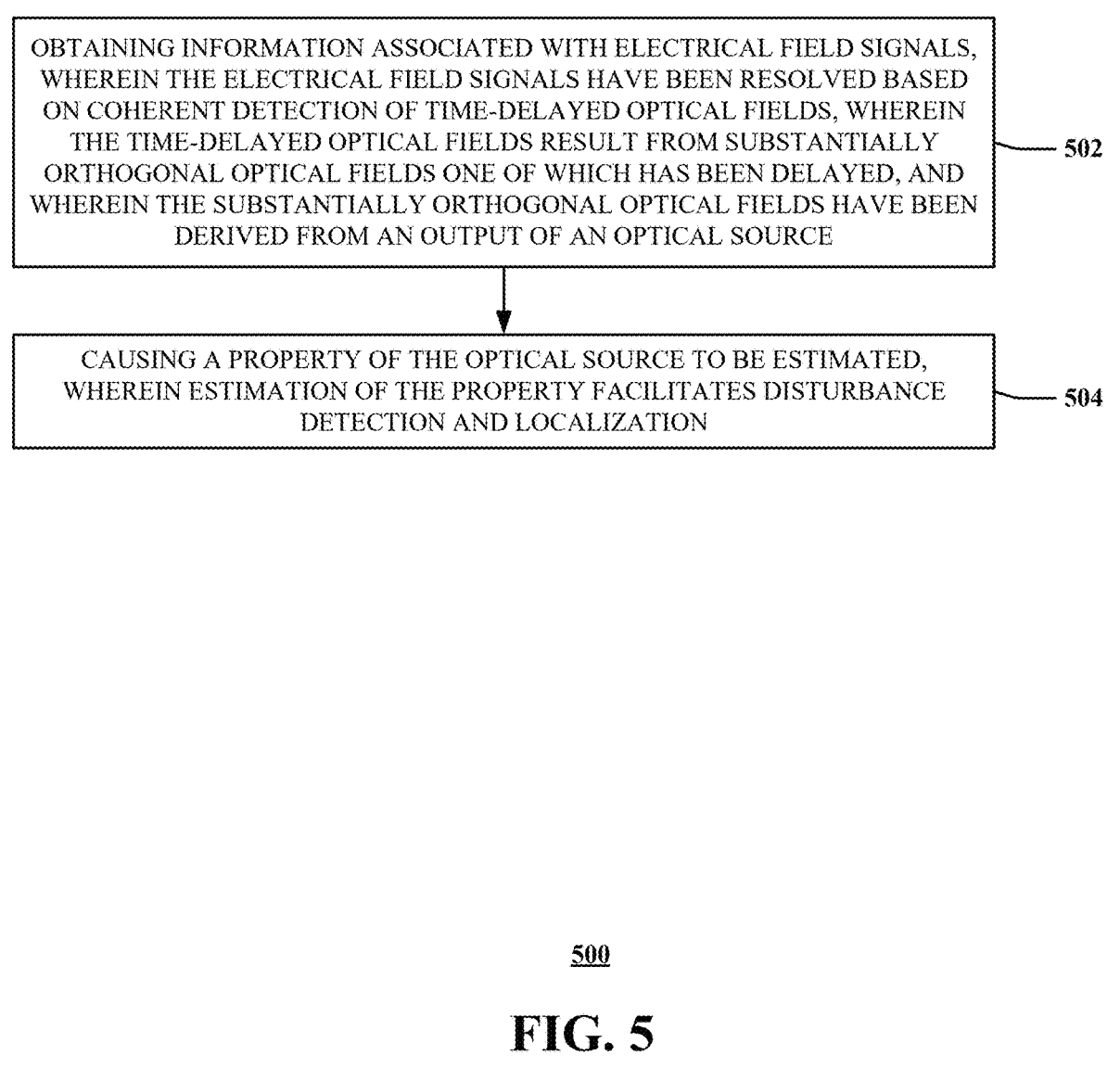

OBTAINING INFORMATION ASSOCIATED WITH ELECTRICAL FIELD SIGNALS, WHEREIN THE ELECTRICAL FIELD SIGNALS HAVE BEEN RESOLVED BASED ON COHERENT DETECTION OF TIME-DELAYED OPTICAL FIELDS, WHEREIN THE TIME-DELAYED OPTICAL FIELDS RESULT FROM SUBSTANTIALLY ORTHOGONAL OPTICAL FIELDS ONE OF WHICH HAS BEEN DELAYED, AND WHEREIN THE SUBSTANTIALLY ORTHOGONAL OPTICAL FIELDS HAVE BEEN DERIVED FROM AN OUTPUT OF AN OPTICAL SOURCE — 502

CAUSING A PROPERTY OF THE OPTICAL SOURCE TO BE ESTIMATED, WHEREIN ESTIMATION OF THE PROPERTY FACILITATES DISTURBANCE DETECTION AND LOCALIZATION — 504

ENHANCED DISTURBANCE MONITORING AND LOCALIZATION ENABLED BY DIGITAL SIGNAL PROCESSING (DSP)-BASED LASER PHASE NOISE ESTIMATION

FIELD OF THE DISCLOSURE

The subject disclosure relates to a disturbance (i.e., vibration) detection and localization in a coherent optical transmission system using one or more coherent transponders.

BACKGROUND

Recently, there has been growing interest in using the optical fiber transport infrastructure for environmental monitoring purposes, particularly for detection and localization of disturbances. Such monitoring capabilities can serve a wide range of applications including, but not limited to, earthquake/tsunami alert systems and network infrastructure outage risk assessment and prevention. Given the ever-growing, wide, geographic coverage of optical fiber transport infrastructures, these systems stand unrivaled among most other existing sensing/monitoring systems.

BRIEF DESCRIPTION OF THE DRAWINGS

Reference will now be made to the accompanying drawings, which are not necessarily drawn to scale, and wherein:

FIGS. 4J to 4Q show simulation results that demonstrate feasibility of optically-delayed polarization division multiplexing (PDM) at a transmitter even in the presence of leakage between two polarizations.

FIG. 5 depicts an illustrative embodiment of a method in accordance with various aspects described herein.

DETAILED DESCRIPTION

Figure 1:
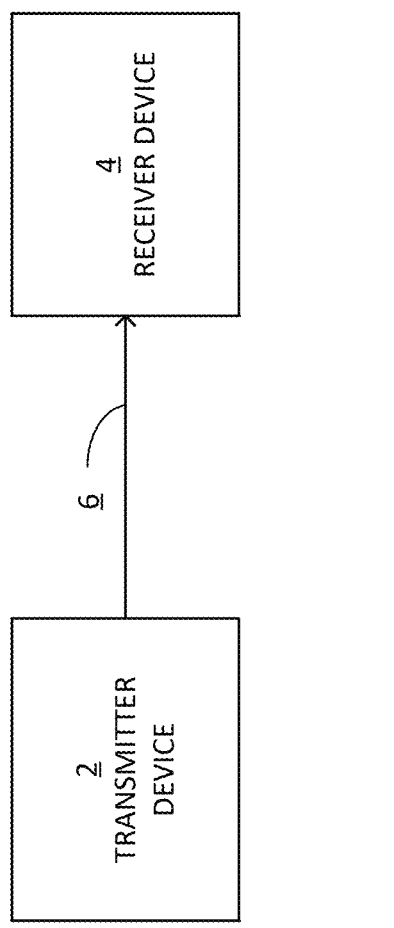
FIG. 1 is a diagram of a non-limiting example of a communication network in accordance with various aspects described herein.

Distributed acoustic sensing (DAS) is an existing fiber sensing technology that relies on the interrogation of the Rayleigh backscattering (RBS) of injected light to the fiber (Z. He et al., "Optical Fiber Distributed Acoustic Sensors: A Review," *Journal of Lightwave Technology*, vol. 39, no. 12, pp. 3671-3686, Jun. 2021, which is incorporated herein by reference in its entirety). Due to performance considerations in telecommunication (telecom) transport networks, DAS systems are typically deployed over dark fiber installations to specifically perform sensing functions without relying on telecommunications data transmissions. In S. Guerrier et al., "Vibration detection and localization in buried fiber cable after 80 km of SSMF using digital coherent sensing system with co-propagating 600 Gb/s WDM channels," *Proc. Opt. Fiber Commun. Conf*, paper M2F.3, 2022 (which is incorporated herein by reference in its entirety), a DAS system is demonstrated together with wavelength division multiplexing (WDM) coherent data transmission over an 82-kilometer (km) telecom single-mode fiber (SMF). In this system, only one WDM channel is reserved for the sensing probe at the cost of reduced overall spectral efficiency of the transport network. In He, H. et al. "Integrated sensing and communication in an optical fibre," *Light: Sci. Appl.*, vol. 12, no. 1, Jan. 2023, Art. no. 25 (which is incorporated herein by reference in its entirety), the interrogation is based on a back-scattered Pulse-amplitude modulation (PAM)-4 signal. Spectrum sharing between sensing and communication is achieved, although the distance is limited to 24.5-km due to weak Rayleigh backscattering and chromatic dispersion. To further improve the sensing reach of DAS, E. Ip et al., "DAS Over 1,007-km Hybrid Link With 10-Tb/s DP-16QAM Co-Propagation Using Frequency-Diverse Chirped Pulses," *Journal of Lightwave Technology*, vol. 41, no. 4, pp. 1077-1086, Feb. 2023 (which is incorporated herein by reference in its entirety) proposes replacing inline Erbium-Doped Fiber Amplifiers (EDFAs) with bi-directional EDFAs or Raman amplifiers. In general, DAS systems are limited in operational range (distances of a few tens of kilometers), require dedicated, costly hardware/installations, and are largely incompatible with most present-day telecom infrastructures.

An alternative sensing method involves the monitoring of phase changes of continuous wave (CW) light via laser interferometry schemes. In these methods, the CW light co-propagates with the telecom signal at different wavelengths. This means that traffic cannot be transmitted at the wavelength of CW light, and, like DAS systems, a dedicated sensing system (or transponder) is required.

In Y. Yan et al., "Simultaneous communications and vibration sensing over a single 100-km deployed fiber link by fiber interferometry", *Proc. Opt. Fiber Commun. Conf,* 2023, paper W1J.4 (which is incorporated herein by reference in its entirety), the co-existence of laser interferometry for sensing and coherent signal transmission in the same fiber is investigated in a 100-km field trial. A telecom signal's signal to noise ratio (SNR) degradation is reported when the CW light is turned on due to Kerr nonlinearity of the optical fiber. The vibration is localized by extracting and cross-correlating the phases of a pilot tone co-propagating with a coherent signal and a counter-propagating CW light in the same fiber. In such a bi-directional implementation, the localization relies on extraction of phase, time stamping, and then a time-resolved comparison of the phases of the two directions. With two measured phase records at each end of the bi-directional link, the location of vibration can be pinpointed by cross correlating the two estimated phase records. More specifically, a time delay between the amount of time that the vibration phase imprint travels to each end of the link can be estimated by finding the peak of the cross-correlation of the phase records extracted at each end. And, assuming that the link length is known, the vibration can be localized. In Y. Yan et al., "Forward Transmission Based Ultra-Long Distributed Vibration Sensing With Wide Frequency Response," *Journal of Lightwave Technology*, vol. 39, no. 7, pp. 2241-2249, Apr. 2021 (which is incorporated herein by reference in its entirety), the vibration phase record is localized using a homodyne loop-back setup with a coherent transponder but without telecom data transmission. The loop-back setup can relieve the requirements of time synchronization of two coherent transceivers that are located apart from one another.

In recent years, in-service cable vibration monitoring methods, based on transmission of telecom signals and use of onboard digital signal processing (DSP) engines of coherent transponders, have been proposed. One category of such techniques uses the state of polarization (SOP) of the telecom signal extracted from the coherent transponder. In J. E. Simsarian et al., "Shake before break: Per-span fiber sensing with in-line polarization monitoring," *Proc. Opt. Fiber Commun. Conf.,* 2017, paper M2E.6 (which is incorporated herein by reference in its entirety), a SOP monitoring method is demonstrated for detecting SOP transients caused by disturbances on each span of a cable through an optical supervisory channel between sites of amplifiers. In M. Cantono et al., "Sub-Hertz Spectral Analysis of Polarization of Light in a Transcontinental Submarine Cable," *Proc. Eur. Conf Opt. Commun.,* 2020, pp. 1-3 (which is incorporated herein by reference in its entirety), a field trial demonstrates that seismic events can be detected by estimating the Stokes parameters from coefficients of adaptive filters of the coherent transponder.

An alternative technique to SOP-based monitoring relies on optical phase detection, which is more sensitive given its direct proportionality to longitudinal strain induced by vibration via the fiber's refractive index. In a field trial described in G. A. Wellbrock et al., "Field trial of vibration detection and localization using coherent telecom transponders over 380-km link," *Proc. Opt. Fiber Commun. Conf,* 2021, paper F3B.2 (which is incorporated herein by reference in its entirety), the optical phase is estimated with a carrier phase recovery (CPR) block of a coherent transponder to monitor the light phase change due to longitudinal strain caused by mechanical vibrations on the optical cable. The field trial results show that various vibration events including knocking of pole, intrusion, tampering, etc., can be detected and localized in a 380-km bidirectional link. Further investigations in E. Ip et al., "Vibration detection and localization using modified digital coherent telecom transponders," *Journal of Lightwave Technology*, vol. 40, no. 5, pp. 1472-1482, Mar. 2022 (which is incorporated herein by reference in its entirety) demonstrate that phase detection can achieve higher SNR and bandwidth than SOP detection, leading to higher vibration event localization accuracy. However, two ultra-narrow linewidth fiber lasers are utilized to minimize laser phase noise impact on the vibration-induced phase change. These ultra-narrow stable fiber lasers are not practical in current coherent transponders due to cost, size, and other relevant performance considerations, such as temperature stability and tolerance to shock and mechanical vibration.

The subject disclosure describes illustrative embodiments of disturbance (i.e., vibration) detection and localization in a (e.g., bidirectional) coherent optical transmission system using one or more coherent transponders. In exemplary embodiments, an optical architecture and corresponding DSP method are provided to enable the determination of phase noise contribution of a transmit (far-end) optical source at a receiver (near-end) in the coherent optical transmission system. This determined information, along with the obtained or retrieved phase of the optical carrier, allows for improved disturbance detection and localization.

In certain exemplary embodiments, optically-delayed polarization division multiplexing (PDM) may be provided by way of a (e.g., installed) time delay between two polarizations from the same transmitter laser source, prior to data modulation. At the receive end, the transmitter laser phase noise waveform may be reconstructed using the DSP method and knowledge of the installed time delay.

Various other alternative implementations for improved disturbance detection and localization are possible. For instance, although somewhat less practical due to required delays (e.g., 1-5 ns), the time delay may, in some embodiments, alternatively be implemented in the electrical domain, such as on the polarization data drive instructions, and compensated for at the receiver to enable an estimate of the transmitter laser phase noise by means of similar arithmetic. As another example, in some alternative implementations, the optical delay may be provided between two carrier frequencies from the same transmitter laser source, prior to data modulation. Descriptions of other example variations are provided in more detail below.

In one or more embodiments, the localization relies on a bi-directional extraction of phase, time stamping, and a time-resolved comparison of the phases of two directions. Phase noise estimates for both directions may be used in a de-noising stage prior to the time-resolved comparison. Some or all of these various functionalities may be implemented in a central processing unit or system. For instance, the transmitter laser phase noise may be estimated at a receive end, for each direction of the bi-directional communication, where the central system may remove these laser phase estimates from an extracted raw phase, thereby enabling improved sensing sensitivity and thus a more accurate detection and localization capability.

While a coherent transponder's main purpose is to facilitate telecommunications (modulation and demodulation), its capability to detect and mitigate the phase of the optical carrier makes it especially useful for disturbance detection and localization. Phase is generally more sensitive to disturbances than state of polarization, and thus is a more useful characteristic to analyze for disturbance monitoring. Of course, there are sources of noise, such as laser phase noise, that can impede the use of phase for disturbance monitoring. Smaller linewidth lasers can help, but they are costly and bulky. Exemplary embodiments described herein provide a more practical solution for mitigating laser phase noise, by facilitating estimation of phase noise contributed by the involved lasers, and subtraction of these phase noise contributions from an optical carrier phase estimate. This de-noising process advantageously results in a "cleaner" optical carrier phase estimate that can then be leveraged for more accurate detection and localization of disturbances. Indeed, monitoring optical carrier phase in the presence of phase noise originating from the transmit optical source and the receive local oscillator in coherent transmission systems, as described herein, enables superior disturbance detection and localization. It is worth noting that, in various embodiments, independent X and Y polarization carrier phase estimates and/or independent intermediate frequency phase estimates, described herein, can be made available with relatively low hardware complexity. That is, only modest hardware modifications (e.g., for introducing optical delay(s), frequency shift(s), or the like) may be needed, and the otherwise stringent requirements on laser linewidth as well as the use of phase discriminator devices are alleviated. One skilled in the art would readily recognize that the exemplary embodiments advantageously relax the phase noise requirements of the lasers—that is, improved disturbance detection and localization can be achieved even if sub-optimal, larger linewidth lasers are used in the system. Further, the overhead of the required DSP algorithms is also low. Furthermore, although exemplary techniques are suited for in-service, bi-directional transmission systems, the techniques may be adapted for use in out-of-service, bi-directional systems or in homodyne loop-back configurations.

One or more aspects of the subject disclosure include a system. The system may include at least a first component configured to derive substantially orthogonal optical fields from an output of an optical source, at least a second component configured to implement a delay on one of the substantially orthogonal optical fields, resulting in time-delayed optical fields, and a receiver. The receiver may be configured to perform coherent detection of the time-delayed optical fields, resolve electrical field signals based on the coherent detection, and cause the electrical field signals to be processed so as to estimate a property of the optical source, wherein estimation of the property facilitates disturbance detection and localization.

One or more aspects of the subject disclosure include a non-transitory machine-readable medium, comprising executable instructions that, when executed by a processing system including a processor, facilitate performance of operations. The operations may include obtaining information associated with electrical field signals, wherein the electrical field signals have been resolved based on coherent detection of time-delayed optical fields, wherein the time delayed optical fields result from substantially orthogonal optical fields one of which has been delayed, and wherein the substantially orthogonal optical fields have been derived from an output of an optical source. The operations may further include causing a property of the optical source to be estimated, wherein estimation of the property facilitates disturbance detection and localization.

One or more aspects of the subject disclosure include a method. The method may include deriving substantially orthogonal optical fields from an output of an optical source, implementing a delay on one of the substantially orthogonal optical fields, resulting in time delayed optical fields, performing coherent detection of the time-delayed optical fields, resolving electrical field signals based on the coherent detection, and causing the electrical field signals to be processed so as to estimate a property of the optical source, wherein estimation of the property facilitates disturbance detection and localization.

FIG. 1 is a diagram of a non-limiting example of a communication network 1 in accordance with various aspects described herein. The communication network 1 may include at least one transmitter device 2 and at least one receiver device 4. The transmitter device 2 may be capable of transmitting signals over a communication channel, such as a communication channel 6. The receiver device 4 may be capable of receiving signals over a communication channel, such as the communication channel 6. In various embodiments, the transmitter device 2 may also be capable of receiving signals and/or the receiver device 4 may also be capable of transmitting signals. Thus, one or both of the transmitter device 2 and the receiver device 4 may be capable of acting as a transceiver.

The communication network 1 may include additional elements not shown in FIG. 1. For example, the communication network 1 may include one or more additional transmitter devices, one or more additional receiver devices, and one or more other devices or elements involved in the communication of signals in the communication network 1.

In some embodiments, the signals that are transmitted and received in the communication network 1 may include optical signals and/or electrical signals. For example, the transmitter device 2 may be a first optical transceiver, the receiver device 4 may be a second optical transceiver, and the communication channel 6 may be an optical communication channel. In certain embodiments, one or both of the first optical transceiver and the second optical transceiver may be a coherent modem.

In various embodiments, each optical communication channel in the communication network 1 may include one or more links, where each link may include one or more spans, and where each span may include a length of optical fiber and one or more optical amplifiers. Where the communication network 1 involves the transmission of optical signals, the communication network 1 may include additional optical elements not shown in FIG. 1, such as wavelength selective switches, optical multiplexers, optical de-multiplexers, optical filters, and/or the like.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 2A:
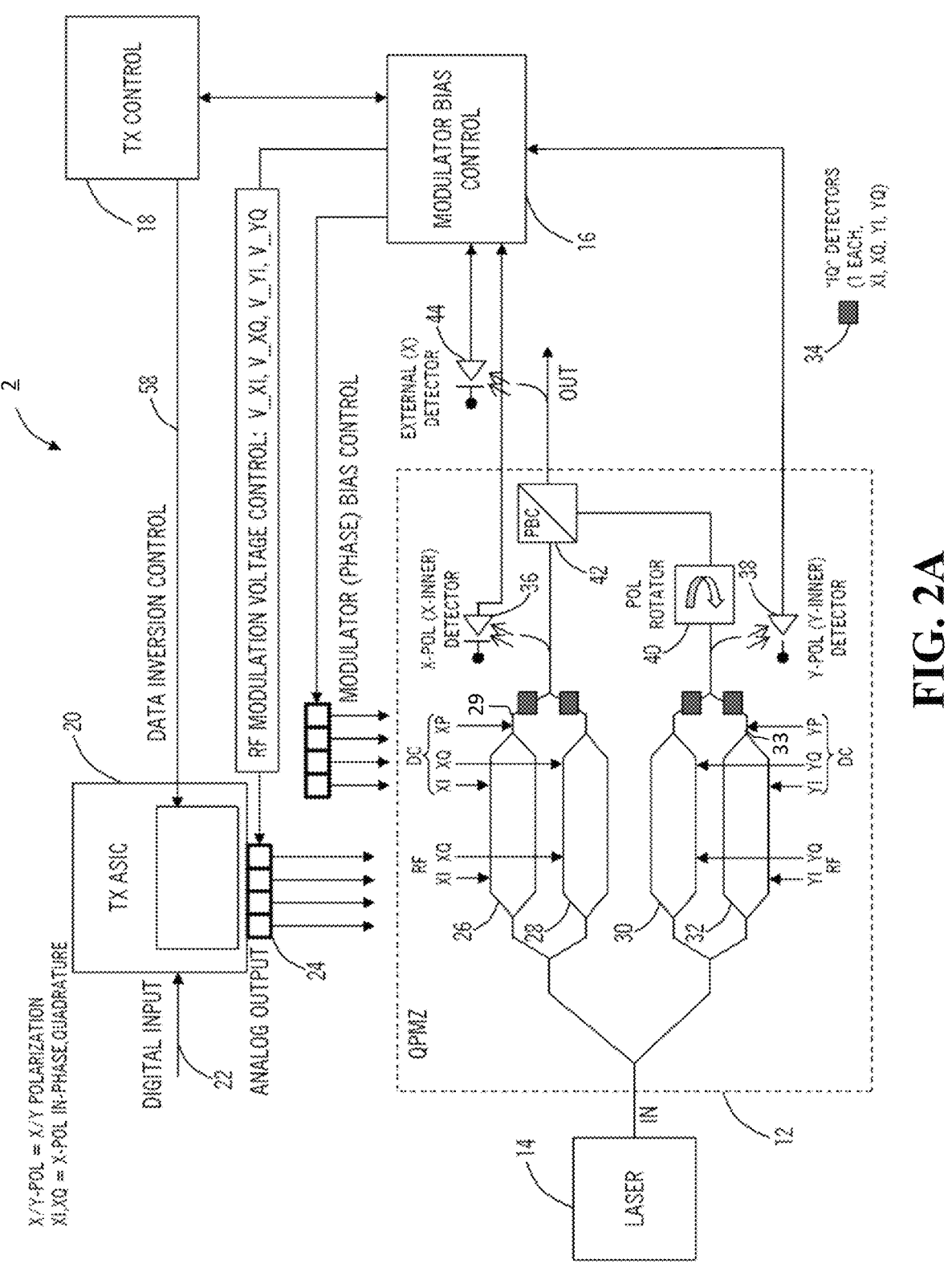
FIG. 2A is a block diagram of an example, non-limiting embodiment of a transmitter/modulator system in accordance with various aspects described herein.

FIG. 2A is a block diagram of an example, non-limiting embodiment of a transmitter/modulator system 2 in accordance with various aspects described herein. As shown in FIG. 2A, the transmitter device 2 may include a combination of optical and electrical components, such as, for example, a modulator 12, a laser 14, a modulator bias controller 16, a transmitter (Tx) controller 18, and a Tx application specific integrated circuit (ASIC) 20. The modulator 12 may employ nested Mach-Zehnder (MZ) architecture(s)—i.e., two dual-parallel MZs (DPMZs), each with two inner MZs and one outer MZ-resulting in a quad parallel MZ (QPMZ) modulator.

In one or more embodiments, the optical modulator system 2 may be equipped to control four quadrature data signals (i.e., radio frequency (RF) XI, RF XQ, RF YI, RF YQ signals, where X, Y denote polarization and I, Q denote in-phase and quadrature, respectively) via the Tx ASIC 20. The modulator 12 may include an XI modulator 26, an XQ modulator 28, and an outer phase modulator 29 (respectively functioning as two inner MZs nested within an outer MZ for the X polarization) as well as a YI modulator 30, a YQ modulator 32, and an outer phase modulator 33 (respectively functioning as two inner MZs nested within an outer MZ for the Y polarization). Each MZ may have one or two DC electrodes depending on the implementation of the MZ. The laser 14 may provide a laser output for modulation by the modulator 12. The laser output may be divided (e.g., via a beam splitter) into X and Y polarizations, where the X polarization may be further divided (e.g., via another beam splitter) into an optical I input that is fed into an X-pol I-arm (i.e., the XI modulator 26) and an optical Q input that is fed into an X-pol Q-arm (i.e., the XQ modulator 28), and where the Y polarization may be further divided (e.g., via yet another beam splitter) into an optical I input that is fed into a Y-pol I-arm (i.e., the YI modulator 30) and an optical Q input that is fed into a Y-pol Q-arm (i.e., the YQ modulator 32). The modulator 12 may be capable of independently generating orthogonal optical electric field components (I channel and Q channel) for each polarization X and Y, according to various types of multi-value modulation methods, such as N-quadrature amplitude modulation (QAM), differential quadrature phase shift keying (D-QPSK), etc.

In general operation, the Tx ASIC 20 may receive a digital information stream at a digital input 22 and convert the digital information stream (based on an associated modulation scheme) for driving the modulator 12 via analog outputs 24 (RF XI, RF XQ, RF YI, RF YQ). The analog outputs 24 may be communicatively coupled to the modulator 12. In some embodiments, the Tx ASIC 20 may include a digital filter that provides a transfer function H on the received digital input 22. A digital-to-analog (D/A) converter may be connected to an output of the digital filter, and an analog amplifier may be connected to an output of the D/A converter to provide a gain G. An output of the analog amplifier may provide the analog output 24 to the modulator 12. In certain embodiments, a controller may be connected to the digital filter and the analog amplifier to control the transfer function H and/or the gain G responsive to a data inversion control signal 58 from the Tx controller 18.

A detector 34 (also referred to as a tap-detector) may be included at an output of each of the modulators 26, 28, 30, 32. In certain embodiments, some or all of the modulators 26, 28, 30, 32 may be referred to as inner modulators and can be amplitude, phase, or mixed phase/amplitude modulators. In one or more embodiments, some or all of the modulators 26, 28, 30, 32 may be phase modulators. As shown, the modulator 12 may include an X-polarization detector 36 that is coupled to a combined output of the modulators 26, 28 (or the output of the outer MZ 29), and a Y-polarization detector 38 that is coupled to a combined output of the modulators 30, 32 (or the output of the outer MZ 33). A polarization rotator 40 may be connected to the combined output of the modulators 30, 32. A polarization beam combiner 42 may be connected to the combined output of the modulators 26, 28 and the combined output of the modulators 30, 32. An output of the polarization beam combiner 42 may provide a modulated output of the modulator 12, and an external detector 44 may be tapped off of the output. The various detectors 34, 36, 38, 44 may be communicatively coupled to the modulator bias controller 16.

As shown in FIG. 2A, several modulator bias points of the modulator 12 may be controlled or optimized via the modulator bias controller 16. In some embodiments, the Tx controller 18 may control the Tx ASIC 20 and/or the modulator bias controller 16. In various embodiments, the Tx controller 18 may control the modulator bias controller 16 in the following ways: (i) open loop control where bias control loops can be opened, enabling direct control of biases and measurement of the detectors 34, 36, 38, 44; and/or (ii) closed loop control where the feedback polarity of the modulator bias controller 16 can be set, but where the modulator bias controller 16 itself implements the feedback control. The Tx controller 18 may identify (e.g., optimum) bias points whereas the modulator bias controller 16 may maintain those points in service. In some embodiments, the modulator bias controller 16 may control the generated analog output signals of the Tx ASIC 20, rather than control bias values of the modulator 12.

Figure 2B:
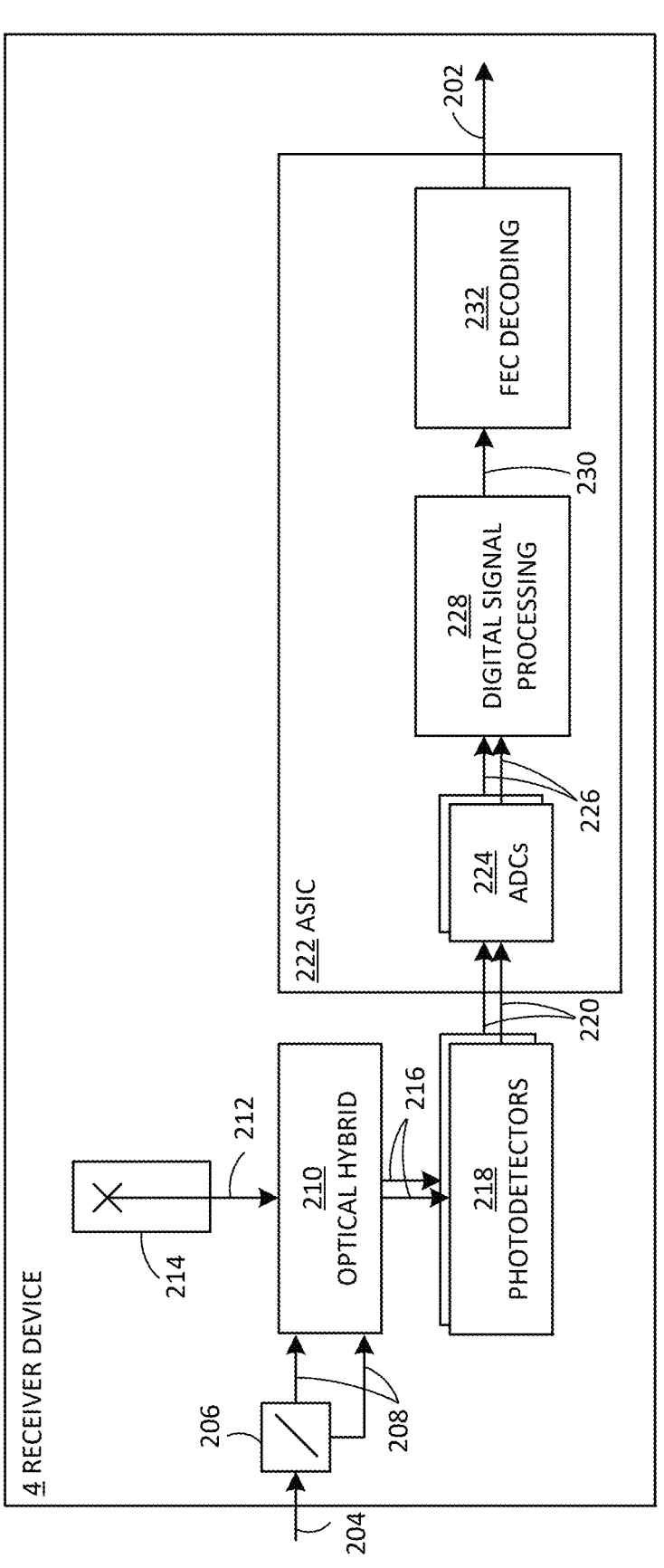
FIG. 2B is a block diagram of an example, non-limiting embodiment of a receiver device in accordance with various aspects described herein.

FIG. 2B is a block diagram of an example, non-limiting embodiment of a receiver device 4 in accordance with various aspects described herein. In various embodiments, the receiver device 4 may be configured to receive an optical signal 204, which may comprise a degraded version of an optical signal generated by a transmitter device (e.g., the transmitter device 2 of FIG. 1). The optical signal generated by the transmitter device may be representative of information bits (also referred to as client bits) which are to be communicated to the receiver device 4. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, and where each carrier is generated by a different laser), and/or the like.

The receiver device 4 may be configured to recover corrected client bits 202 from the received optical signal 204. The receiver device 4 may include a polarizing beam splitter 206 configured to split the received optical signal 204 into polarized components 208. According to one example implementation, the polarized components 208 may include orthogonally polarized components corresponding to an X polarization and a Y polarization. An optical hybrid 210 may be configured to process the components 208 with respect to an optical signal 212 produced by a laser 214, thereby resulting in optical signals 216. Photodetectors 218 may be configured to convert the optical signals 216 output by the optical hybrid 210 to analog electrical signals 220. The frequency difference between the Rx laser and the Tx laser is the Intermediate Frequency, and an offset of that away from nominal can be called fIF. (The nominal difference is usually zero.) According to one example implementation, the analog electrical signals 220 may include four signals corresponding, respectively, to the dimensions XI, XQ, YI, and YQ, where XI and XQ denote the in-phase and quadrature components of the X polarization, and YI and YQ denote the in phase and quadrature components of the Y polarization. Together, elements such as the beam splitter 206, the laser 214, the optical hybrid 210, and the photodetectors 218 may form a communication interface configured to receive optical signals from other devices in a communication network.

As shown in FIG. 2B, the receiver device 4 may include an application specific integrated circuit (ASIC) 222. The ASIC 222 may include analog-to-digital converters (ADCs) 224 that are configured to sample the analog electrical signals 220 and generate respective digital signals 226. In certain alternate embodiments, the ADCs 224 or portions thereof may be separate from the ASIC 222. The ADCs 224 may sample the analog electrical signals 220 periodically at a sample rate that is based on a signal received from a voltage-controlled oscillator (VCO) at the receiver device 4 (not shown). The ASIC 222 may be configured to apply digital signal processing to the digital signals 226 using a digital signal processing system 228. The digital signal processing system 228 may be configured to perform equalization processing that is designed to compensate for a variety of channel impairments, such as CD, SOP rotation, mean PMD that determines the probability distribution which instantiates as differential group delay (DGD), PDL or PDG, and/or other effects. The digital signal processing system 228 may further be configured to perform carrier recovery processing, which may include calculating an estimate of carrier frequency offset fIF (i.e., the difference between the frequency of the transmitter laser and the frequency of the receiver laser 214). According to some example implementations, the digital signal processing system 228 may further be configured to perform operations such as multiple-input-multiple-output (MIMO) filtering, clock recovery, and FDM subcarrier de-multiplexing. The digital signal processing system 228 may also be configured to perform symbol-to-bit demapping (or decoding) using a decision circuit, such that signals 230 output by the digital signal processing system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the digital signal processing system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

In exemplary embodiments, a bi-directional optical communication system may be implemented with optically-delayed polarization division multiplexing (PDM) at the transmitters, where the receivers may each be equipped with carrier phase recovery (CPR) functionality that independently tracks polarization phases based on synchronization (sync) symbols or frequency pilot tones. In each transmitter, the optically-delayed PDM may be provided by way of a (e.g., installed) time delay between two polarizations from the same transmitter laser source, prior to data modulation. Each receiver may be configured to reconstruct a transmitter laser phase noise waveform using DSP and knowledge of the installed time delay.

Figure 3A:
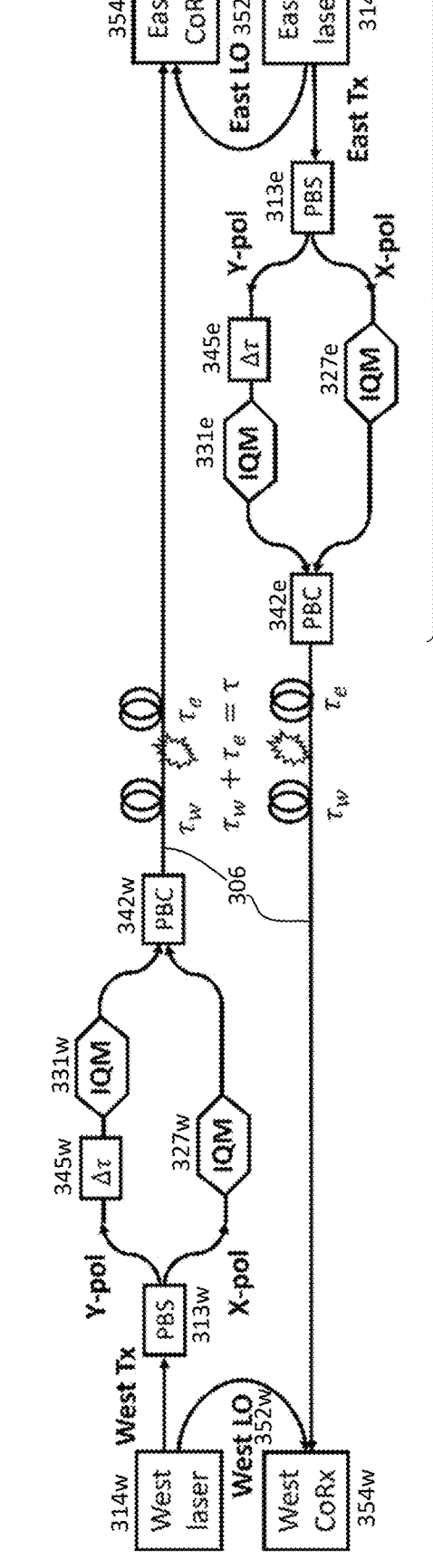
FIG. 3A is a block diagram of an example, non-limiting bi-directional optical communication system in accordance with various aspects described herein.

FIG. 3A is a block diagram of an example, non-limiting bi-directional optical communication system 300 in accordance with various aspects described herein. As shown in FIG. 3A, the system 300 may include two coherent transceivers labeled as West transponder and East transponder. In various embodiments, some or all of the aspects of the West transponder and/or the East transponder may be similar to (or the same as) some or all of the aspects described above with respect to the communication system 1, the transmitter 2, and/or the receiver 4 of FIGS. 1, 2A, and/or 2B. The labels West and East are used herein simply to facilitate description of the two different directions of the bi-directional system, and thus it should be understood and appreciated that the West transponder is not necessarily physically located to the west of the East transponder and vice versa.

The West transponder may include a transmitter laser 314w for the West-to-East direction. It is not uncommon for a coherent transponder to use the same laser for both transmit and receive functionalities. For instance, as depicted, the transmitter laser 314w can serve as the local oscillator 352w for the West transponder's receiver 354w for the East-to-West direction. A polarization beam splitter (PBS) 313w may split the laser output into two polarization paths—i.e., X and Y polarization paths—of a dual polarization (DP) in phase quadrature modulator (implemented in IQMs 327w, 331w). Prior to electro-optic (EO) modulation, one polarization of light may delayed by a group delay (or time delay) with respect to the other polarization of light.

Here, a time delay 345*w* may be implemented or installed in the Y polarization path prior to the IQ modulator 331*w*. It is to be understood and appreciated that, in certain embodiments, the time delay 345*w* may alternatively be implemented or installed in the X polarization path. After the EO modulation, the two polarizations of light may be re-combined by a polarization beam combiner (PBC) 342*w* and launched into a fiber link 306.

Similarly, the East transponder may include a transmit laser 314*e* for the East-to-West direction. The transmit laser 314*e* can serve as the local oscillator 352*e* for the East transponder's receiver 354*e* for the West-to-East direction. A PBS 313*e* may split the laser output into two polarization paths—i.e., X and Y polarization paths—of a DP IQM (implemented in IQMs 327*e*, 331*e*). Prior to EO modulation, one polarization of light may be delayed by a group delay with respect to the other polarization of light. Here, a time delay 345*e* may be implemented or installed in the Y polarization path prior to the IQ modulator 331*e*. It is to be understood and appreciated that, in certain embodiments, the time delay 345*e* may alternatively be implemented or installed in the X polarization path. After the EO modulation, the two polarizations of light may be re-combined by a PBC 342*e* and launched into the fiber link 306.

A time delay may be implemented in any suitable manner, such as by way of a longer waveguide (or more free space) between the PBS and the IQM, one or more photonic integrated circuits (PICs) between the PBS and the IQM (e.g., assuming that a PIC can provide about 250 picoseconds (ps) of optical delay, several PICs may be arranged in series to provide a desired optical delay, such as about 1 to 5 nanoseconds (ns) of optical delay), one or more ring(s), etc. In some embodiments, the time delays 345*w* and 345*e* may be equal to one another. In other embodiments, the time delays 345*w* and 345*e* may be different from one another (e.g., different by at least a threshold difference or by no more than a threshold difference).

Still referring to FIG. 3A, at each of the receive ends—i.e., coherent receivers 354*w* and 354*e*, the two polarizations of signals may be recovered. A DSP system (e.g., corresponding to the DSP system 228 of FIG. 2B) may be configured to estimate the transmitter laser phase noise by applying an appropriate digital filter on the difference of the tracked phase noise of the two polarizations. As described in the mathematical derivation discussion below, this digital filter may provide an inverse response of a finite impulse response (FIR) filter based on knowledge of the installed time delay between the two polarizations. In exemplary embodiments, the CPR functionality in each of the coherent receivers 354*w* and 354*e* may be implemented based on periodic (time-domain) sync symbols or based on one or more (frequency domain) pilot tones. In some embodiments, the coherent receivers 354*w* and 354*e* may employ the same CPR method or different CPR methods. In certain embodiments, the coherent receiver 354*w* may perform a combination of CPR methods, and the coherent receiver 354*e* may perform the same combination of CPR methods or a different combination of CPR methods.

The received optical field at the West and East transponders can be described as follows (e.g., ignoring chromatic dispersion and amplitude noise):

$$E_{Xew}(t) = \left\{ \left( A_{Xew}(t) e^{\left( j\omega_e t + \varphi_{Xe}(t) + \varphi_{vib}(t - \tau_w) + \varphi_{Le}(t - \tau) + \varphi_{X,n,ew}(t) \right)} \right) \right\} \cdot e^{-(j\omega_w t + \varphi_{Lw}(t))},$$

$$E_{Yew}(t) =$$

$$\left\{ \left( A_{Yew}(t) e^{\left( j\omega_e t + \varphi_{Ye}(t) + \varphi_{vib}(t - \tau_w) + \varphi_{Le}(t - \tau - \Delta\tau) + \varphi_{Y,n,ew}(t) \right)} \right) \right\} \cdot e^{-(j\omega_w t + \varphi_{Lw}(t))},$$

$$E_{Xwe}(t) = \left\{ \left( A_{Xwe}(t) e^{\left( j\omega_w t + \varphi_{Xw}(t) + \varphi_{vib}(t - \tau_e) + \varphi_{Lw}(t - \tau) + \varphi_{X,n,we}(t) \right)} \right) \right\} \cdot e^{-(j\omega_e t + \varphi_{Le}(t))},$$

$$E_{Ywe}(t) =$$

$$\left\{ \left( A_{Ywe}(t) e^{\left( j\omega_w t + \varphi_{Yw}(t) + \varphi_{vib}(t - \tau_e) + \varphi_{Lw}(t - \tau - \Delta\tau) + \varphi_{Y,n,we}(t) \right)} \right) \right\} \cdot e^{-(j\omega_e t + \varphi_{Le}(t))}.$$

$E_{Xew}(t)$ and $E_{Yew}(t)$ respectively represent the received X polarization field and Y polarization field in the east to west direction (denoted with subscript ew). $E_{Xwe}(t)$ and $E_{Ywe}(t)$ respectively represent the received X polarization field and Y polarization field in the west to east direction (denoted with subscript we). Additionally, $\omega_e$ and $\omega_w$ are the optical angular frequencies of the east and west lasers, $A_{Xew}(t)$, $A_{Yew}(t)$, $A_{xwe}(t)$, and $A_{Ywe}(t)$ represent amplitude information, $\varphi_{Xe}(t)$, $\varphi_{Ye}(t)$, $\varphi_{Xw}(t)$, $\varphi_{Yw}(t)$ represent phase information of data in the various polarizations transmitted from the east and west transponders, and $\varphi_{Le}(t)$ and $\varphi_{Lw}(t)$ represent laser phase noise of the east and west lasers. Accumulated phase noise (e.g., dispersion-related phase noise, amplitude-related phase noise, equalization enhanced phase noise (EEPN), and/or other non-linearity-related phase noises), which may exclude laser phase noise, is denoted by $\varphi_{X,n,ew}(t)$, $\varphi_{Y,n,w}(t)$, $\varphi_{X,n,we}(t)$, and $\varphi_{Y,n,we}(t)$. Further, $\tau$ is the total time delay over a single-direction transmission distance of the bi-directional system, $\Delta\tau$ is the installed time delay for the Y polarization prior to data signal modulation, $\varphi_{vib}(t)$ is the vibration-induced phase change (i.e., due to a disturbance) that acts on fiber pairs of the bi-directional link, and $\tau_w$, and $\tau_e$ are the respective propagation times of the vibration phase to the west and east transponders.

For purposes of illustration, we now describe the process of retrieving transmitter laser phase noise for the east to west transmission. In a coherent receiver and after ADC, the digitized electrical waveforms of in-phase and quadrature of the polarization multiplexed signal may be fed into a chain of DSP blocks tasked with compensating various impairments of the communication channel (the transceiver and the fiber). CPR is one of these blocks that estimates the carrier phase noise of the optical carrier. In exemplary embodiments, the CPR block of a coherent transponder may be used to monitor carrier phase for vibration sensing without requiring extra or dedicated hardware. If the CPR block is engineered or designed in a way to provide independent phase estimates across X and Y polarizations, then the following equations may apply:

$$\theta_{X,ew}[n] = \varphi_{vib}[n - N_w] + \varphi_{Le}[n - N] - \varphi_{Lw}[n] + \varphi'_{X,n,ew}[n]$$

and $$\theta_{Y,ew}[n] = \varphi_{vib}[n - N_w] + \varphi_{Le}[n - N - \Delta N] - \varphi_{Lw}[n] + \varphi'_{X,n,ew}[n].$$

Here, $\varphi_{Xn,ew}'[n]$ and $\varphi_{Y,n,ew}'[n]$ represent accumulated phase noise contribution excluding the lasers' phase noise after the action of CPR. Generally, DSP equalization in a coherent transponder, which compensates for chromatic dispersion, can result in EEPN after various equalization stages. Thus, the accumulated phase noise terms may include EEPN. In the equations, n is the sample index, $N_w$, N, and $\Delta N$ are the corresponding numbers of samples at the receiver-side sampling rate for different time delays. $N_w$ captures the delay between vibration location and the west transponder, N captures the delay between the east and west transponders, and $\Delta N$ captures the installed delay between the X and Y polarizations. If we perform a subtraction operation on the above two equations, the following equation can be obtained:

$$\Delta\theta_{X-Y,ew}[n] = \varphi_{Le}[n-N] - \varphi_{Le}[n-N-\Delta N] + \left(\varphi'_{X,n,ew}[n] - \varphi'_{Y,n,ew}[n]\right).$$

By inspecting the right-hand side of this equation, one can deduce that the action of the first two terms is equivalent to filtering of the east laser phase noise by a causal FIR filter that combines the input and the delayed version of the input with opposite sign of weights. Ignoring the noise terms, an inverse transfer function can be applied to obtain the digital transmitter laser phase noise. Specifically, we can perform Fourier transform to both sides of the above equation to obtain the frequency-domain representation as follows:

$$\Delta\theta_{ew}[\omega] = \varphi_{Le}[\omega] \cdot e^{-j\omega N} - \varphi_{Le}[\omega] \cdot e^{-j\omega(N+\Delta N)} = \varphi_{Le}[\omega] \cdot H[\omega],$$

where $$\omega = \frac{2\pi k}{N},$$

where k, where k can take integer values from 0 to the size of the discrete Fourier transform (DFT) minus one. Next, we can apply an inverse of $H[\omega]$ to both sides of the equation to obtain the estimation of the transmitter laser phase noise in the frequency domain:

$$\varphi_{Le}[\omega] = \Delta\theta[\omega] \cdot \frac{1}{e^{-j\omega N} - e^{-j\omega(N+\Delta N)}}.$$

Note that depending on the value of AN, the applied inverse transfer function of $H[\omega]$ can have multiple singularities at $$\omega = \frac{2\pi m}{\Delta N},$$

where m takes integer values. At these singularities, the amplitude of the denominator of the inverse transfer function may need to be handled with care, for example, by setting it to one or a small non-zero value. Finally, the recovered laser phase noise can be transformed back to into the time domain using an inverse DFT:

$$\varphi_{Le}[n] = IDFT\{\varphi_{Le}[\omega]\} = IDFT\left\{\Delta\theta_{ew}[\omega] \cdot \frac{1}{e^{-j\omega N} - e^{-j\omega(N+\Delta N)}}\right\}.$$

In this way, an estimate of the phase noise of the east laser may be obtained at the west receiver. The same (or a similar) process can be performed by the east receiver for the west to east transmission case to obtain an estimate of the west laser phase noise, $\varphi_{L,w}[n]$. For instance, the following equations (derived from corresponding optical field equations) may be used:

$$\theta_{X,we}[n] = \varphi_{vib}[n - N_e] + \varphi_{Lw}[n - N] - \varphi_{Le}[n] + \varphi'_{X,n,we}[n] \text{ and}$$

$$\theta_{Y,we}[n] = \varphi_{vib}[n - N_e] + \varphi_{Lw}[n - N - \Delta N] - \varphi_{Le}[n] + \varphi'_{Y,n,we}[n].$$

In any case, after obtaining or retrieving the phase noises contributed by both lasers, the vibration phase change $\varphi_{vib}$ [n] can accordingly be recovered by subtracting the laser phase noise contributions. In some implementations, the total phase transductions represented in an optical field equation (or a derivation therefrom) may be averaged with the total phase transductions represented in one or more of the other optical field equations (or derivation(s) therefrom), where the determined laser phase noise contributions may be subtracted from that average to facilitate extraction of $\varphi_{vib}$. Such averaging may help to reduce the accumulated phase noise terms. Other techniques involving the use of phase transductions represented in one or more of the optical field equations (or derivations therefrom) to facilitate extraction of $\varphi_{vib}$ are of course possible.

The following is a brief description of an example process that a first coherent transponder (e.g., West transponder of FIG. 3A) and a second coherent transponder (e.g., East transponder of FIG. 3A) may perform to facilitate disturbance monitoring and localization. At the first coherent transponder's transmitter, a continuous-wave laser signal may be split into two polarization paths, wherein one of the polarization paths experiences an optical delay (i.e., an installed time delay) compared to the other polarization path. Electro-optical modulation of each polarization path may then be applied and the two polarization paths may be combined into a polarization-multiplexed optical signal for output into the fiber link. The delayed dual polarization optical signals may be received at the second coherent transponder's receiver, which may include a 90-degree dual-polarization hybrid and an LO laser. In the second coherent transponder's receiver, independent polarization carrier phases may be tracked by CPR functionality based on sync symbols or frequency pilot tones. The transmitter laser phase noise from the difference between two tracked polarization phases may be obtained or retrieved by applying an inverse of the transfer function of an FIR filter based on the installed time delay between the two polarization paths at the transmitter. The second coherent transponder's own transmitter laser phase noise for the other transmission direction (or, in essence, the second coherent transponder's own LO phase noise) may be similarly obtained or retrieved. For instance, the first coherent transponder's receiver may similarly receive delayed dual polarization optical signals transmitted from the second coherent transponder's transmitter, perform similar processing to estimate the phase noise of the second coherenttransponder's transmitter, and provide the estimate to the second coherent transponder (or to an external system). In any case, the obtained estimates of laser phase noise contributions may then be removed from the total phase for each direction to determine a (e.g., acoustic) vibration-induced phase change, thereby improving disturbance detection sensitivity and localization.

Implementation of the delay in the transmitter enables estimation of the transmitter laser phase noise (i.e., far-end laser phase noise estimation). Further below, we discuss some implementations of the delay on the LO, which enables estimation of the receiver laser phase noise (i.e., near-end laser phase noise estimation).

Figure 3B:
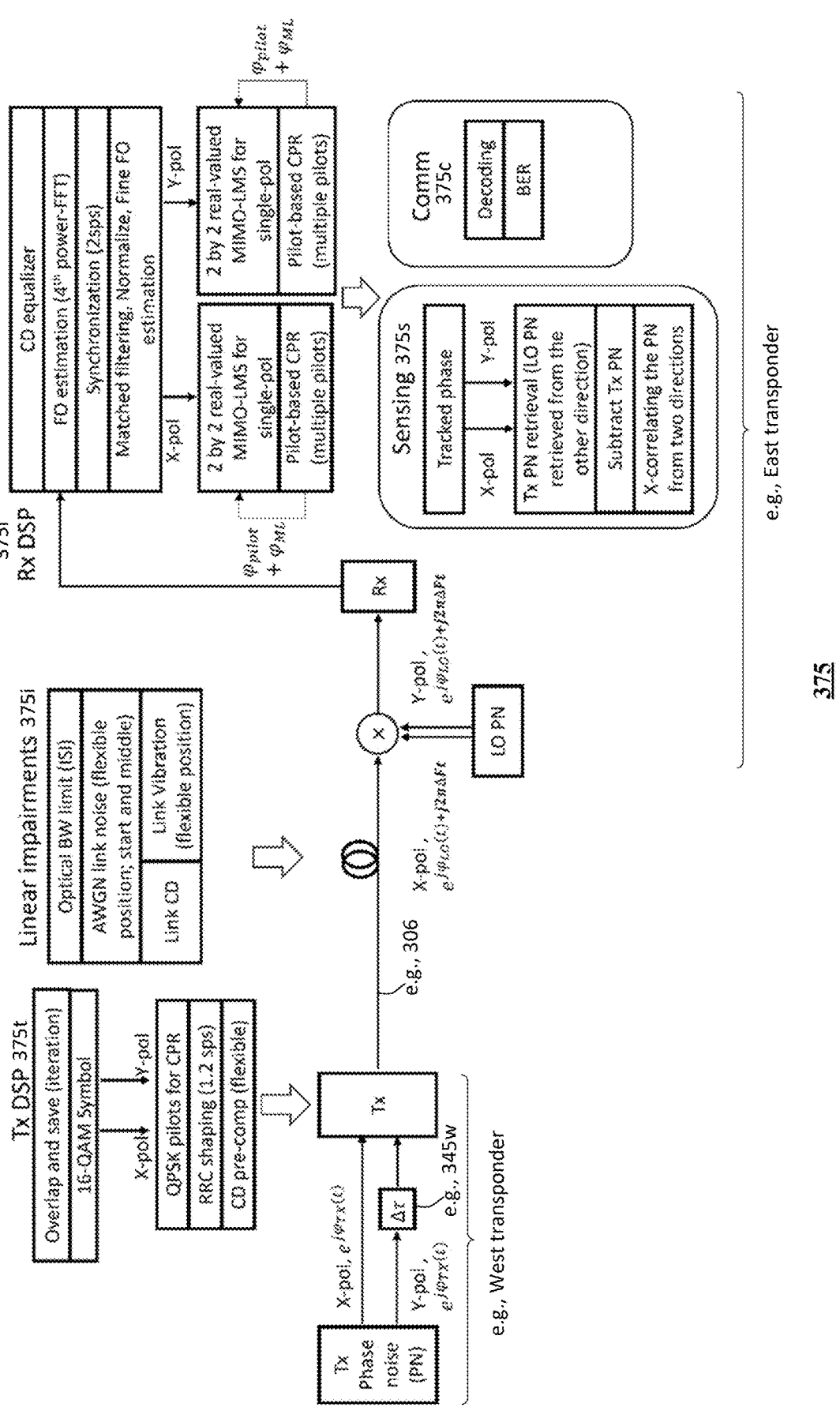
FIG. 3B is a diagram of an example coherent transmission platform architecture in accordance with various aspects described herein.

FIG. 3B is a diagram of an example coherent transmission platform architecture 375 in accordance with various aspects described herein. In exemplary embodiments, the platform 375 may be similar to or otherwise correspond to the system 300 of FIG. 3A. An example simulation of the architecture 375 was made in a numeric computing environment (i.e., MATLAB) to examine the performance of the exemplary scheme shown. With reference to FIG. 3B, in the transmitter stage (e.g., the transmitter of the West transponder of FIG. 3A), Tx DSP functionality 375*t* may generate 100 Gbaud 16-QAM complex symbols and insert QPSK sync symbols in the time domain. The signal may be resampled to a digital to analog convert (DAC) rate of 120 giga samples (GSa)/s for root raised cosine pulse shaping followed by a flexible CD pre-compensation module. The laser phase noise may be modelled based on a Wiener process in which the phase between two close samples is given by the product between the sample duration and the laser Lorentzian linewidth. Y polarization phase noise may be delayed by 5 ns in the time domain with respect to the X polarization laser phase noise, prior to deriving coherent double side band complex signals. In the transmission link (e.g., 306), a Gaussian low pass filter with 3-dB bandwidth of 50 GHz may be applied to the signal. Complex additive white Gaussian noise (AWGN) with different random seeds for each polarization may be added to emulate the system noise. Linear impairments 375*i* may be added. More particularly, a CD frequency response may be applied to the signals in the frequency domain and a vibration phase may be applied to the link. In the receiver stage (e.g., the receiver of the East transponder), the LO with a different random seed phase noise may be mixed with the received signals, where a frequency offset may also be applied between the transmitter laser and the LO. The received coherent signals may first be compensated via Rx DSP functionality 375*r* i.e., with a fixed CD equalizer and a coarse frequency offset estimation. After frame synchronizations, the baseband signals may be matched filtered, normalized, and compensated by a fine frequency offset (FO) estimation stage. Then, the signals of the two polarizations may be sent to two independent least mean square (LMS)-based multiple-input-multiple-output (MIMO) equalizers interleaved with sync symbol-based CPR. Decoding and BER functionality (375*c*) may be performed on the signals. More importantly, sensing functionality 375*s* may utilize the tracked phase of each polarization to retrieve or estimate the transmitter laser phase noise.

FIGS. 3C to 3J show example simulation results for various cases, in accordance with various aspects described herein. In example simulations, the transmitter and receiver laser linewidths were set to 100 kHz, CD was set to 1.7 ns/nanometer (nm) (100 km single-mode fiber (SMF)-28) and 102 ns/nm (6000 km SMF-28) in different cases, 16QAM symbol rate 100 Gbaud was used, inter-polarization delay was set to 5 ns, waveform length was 0.14 ms, and vibration frequency was between 10 kHz and 30 kHz.

Figure 3C:
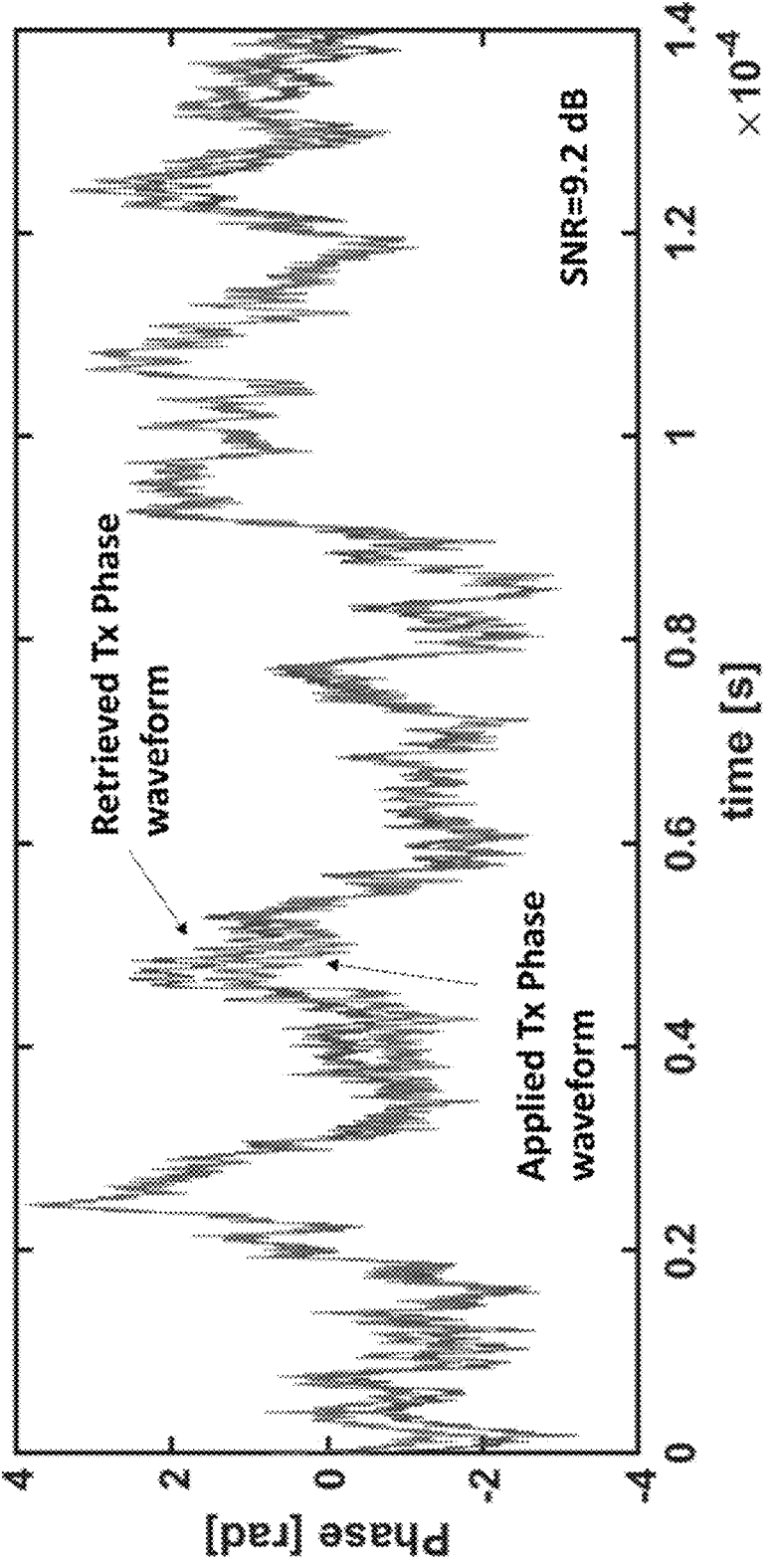
FIGS. 3C to 3J show example simulation results for various cases, in accordance with various aspects described herein.
Figure 3D:
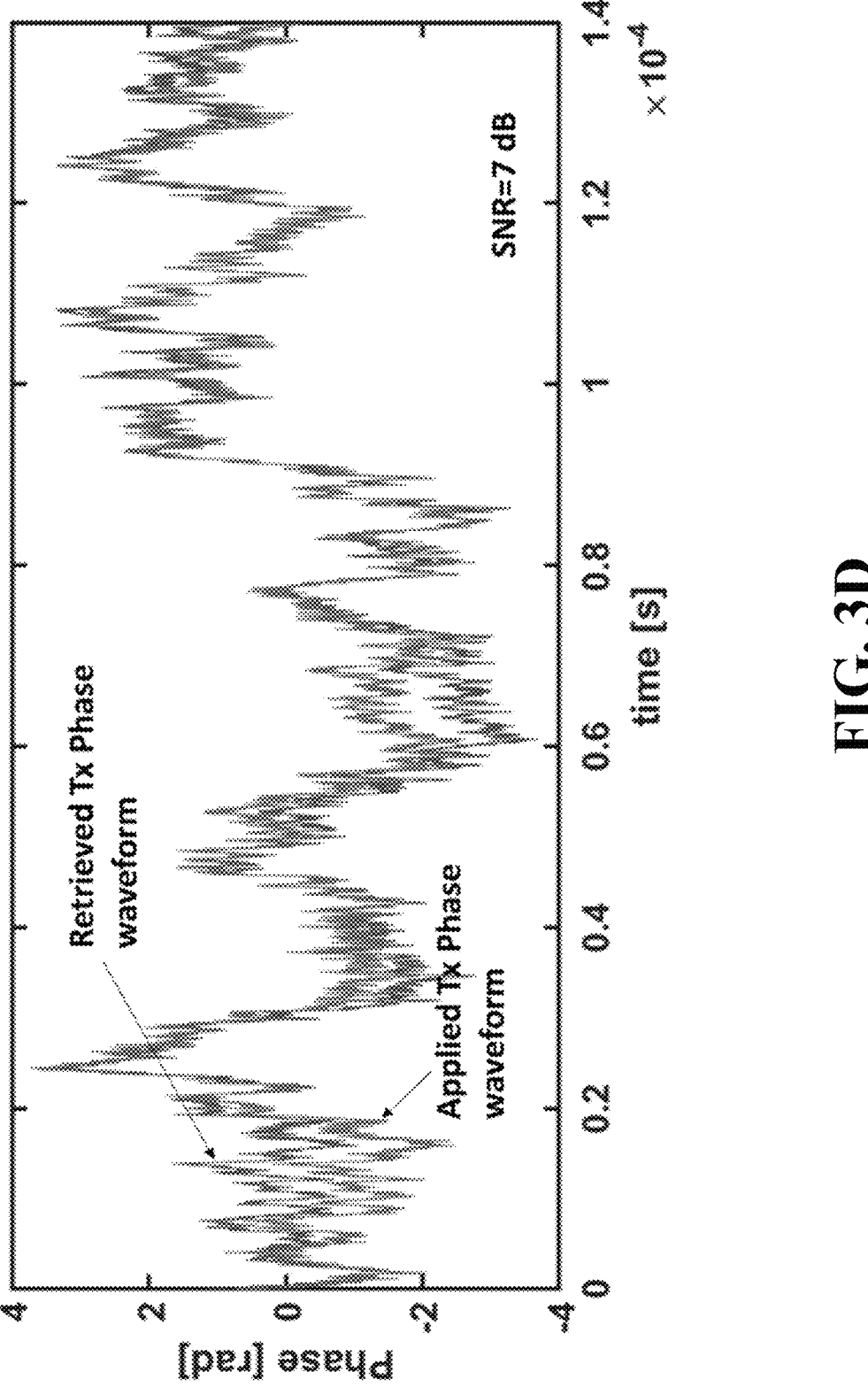

FIG. 3C shows the estimated laser phase noise versus an applied transmitter laser phase noise in the case of 1.7 ns/nm CD. FIG. 3D shows the estimated laser phase noise versus an applied transmitter laser phase noise in the case of the 100 kHz linewidth laser and 102 ns/nm CD. For a fair comparison, IF compensation was applied to the transmitter laser phase noise to remove the natural IF. As shown in FIGS. 3C and 3D, the SNR of the estimated transmitter laser phase noise is 9.2 decibels (dB) for the 1.7 ns/nm transmission case and 7 dB for the 102 ns/nm case.

Figure 3E:
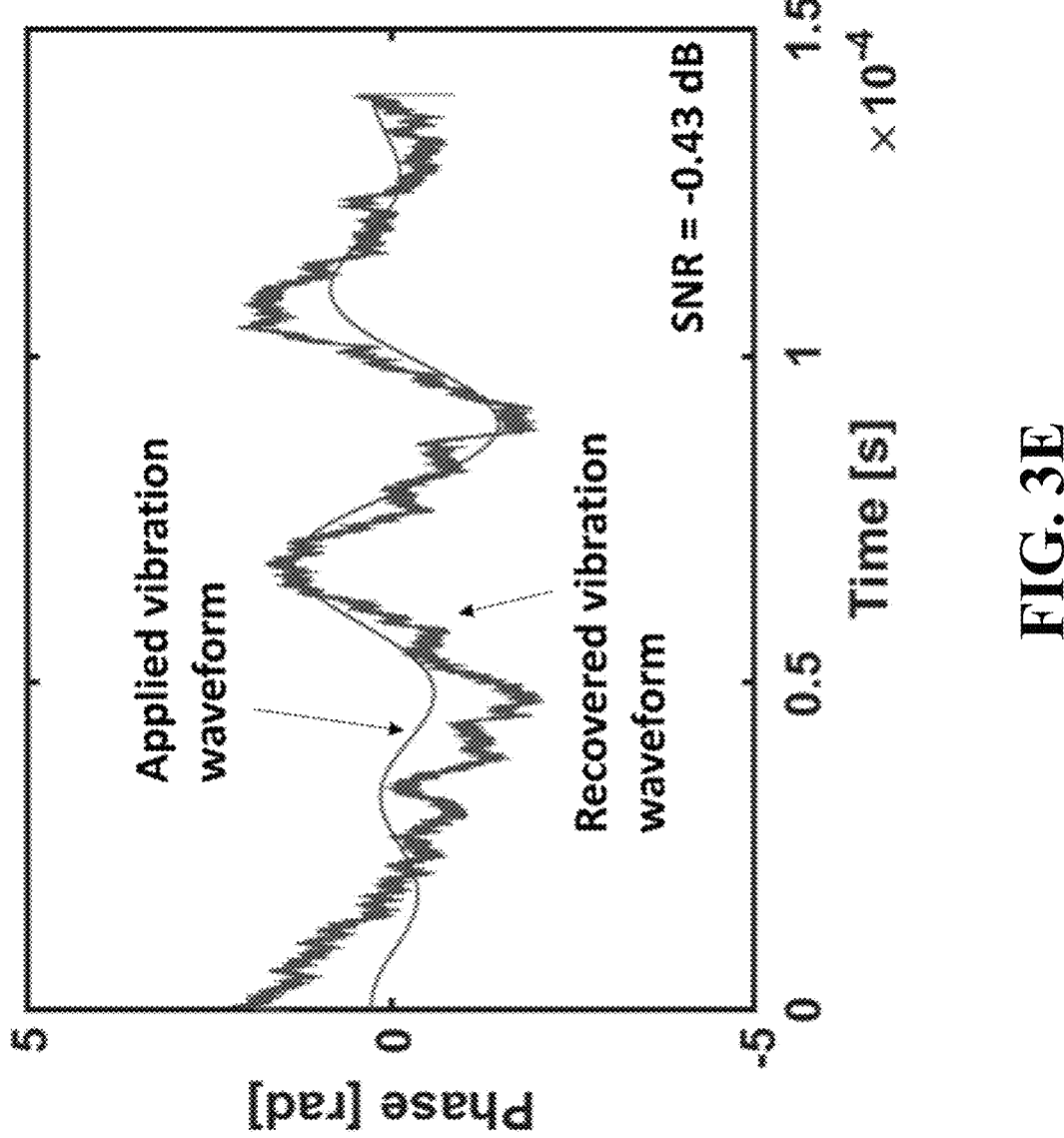
Figure 3F:
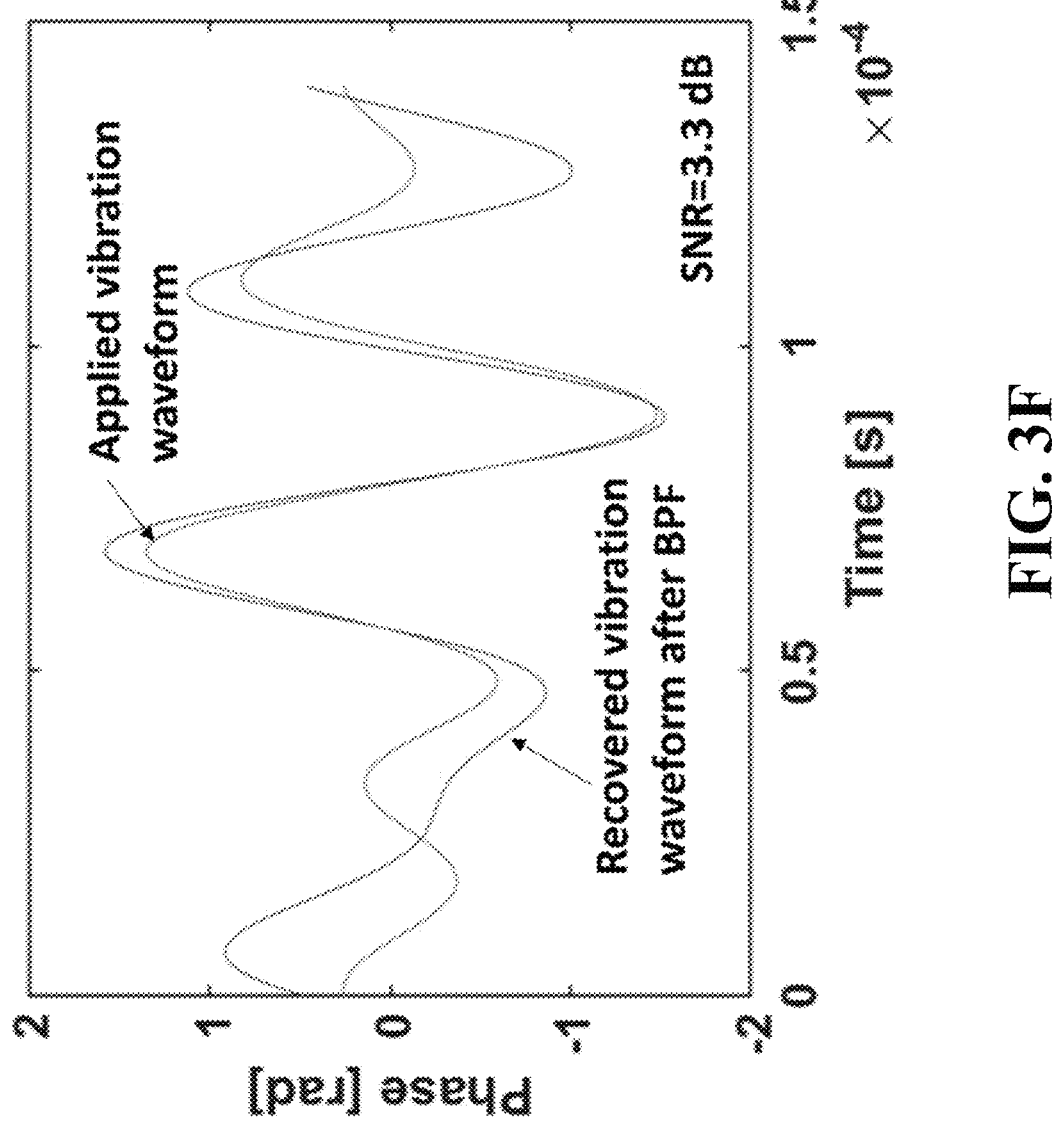
Figure 3G:
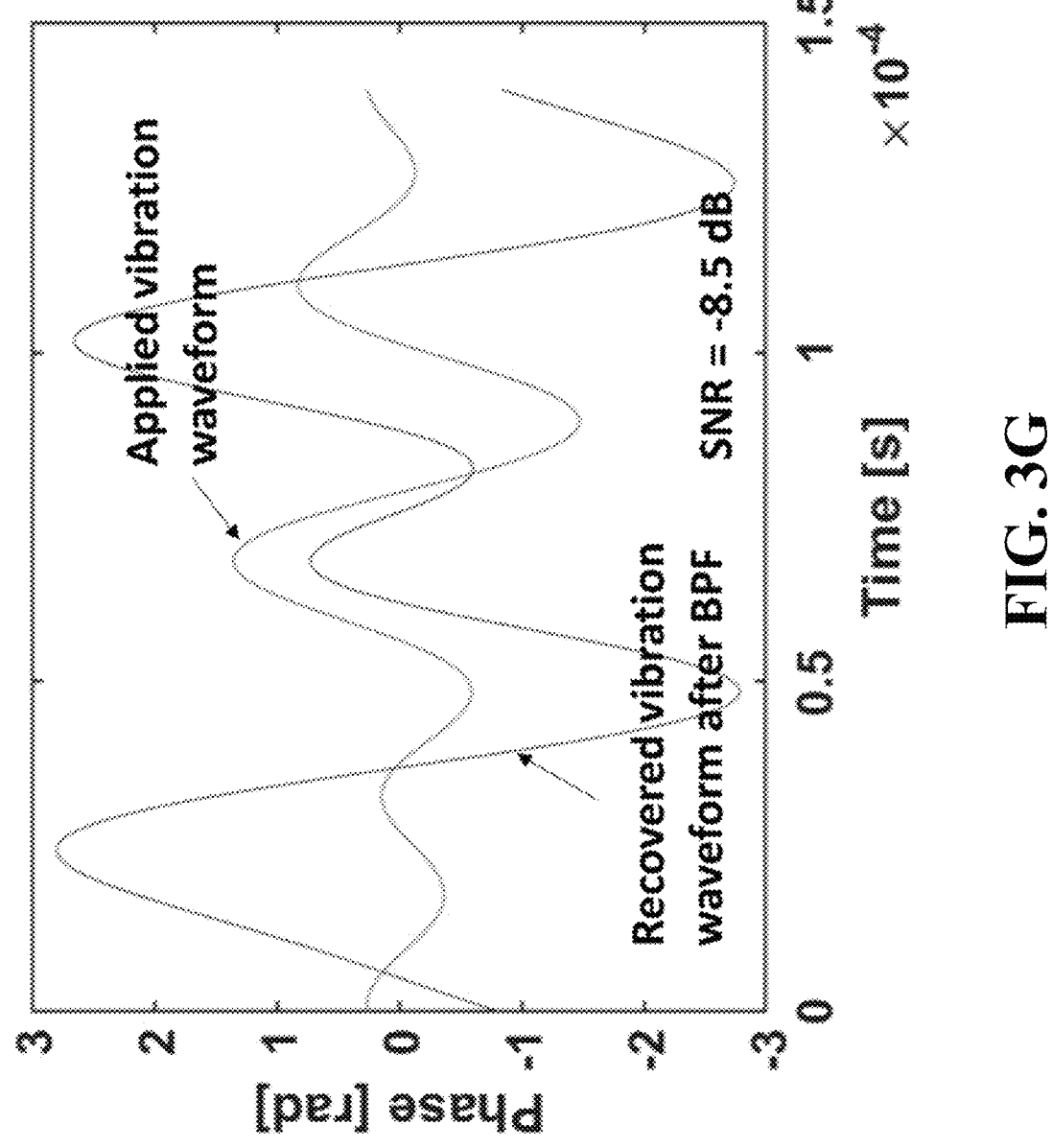

FIG. 3E shows the identified or recovered vibration noise using an exemplary method (i.e., discussed above with respect to FIGS. 3A and/or 3B) versus the applied vibration for the 1.7 ns/nm CD case. With the estimated Tx laser phase noise for both directions, the vibration phase can be estimated as shown in FIG. 3E, which provides an SNR of −0.43 dB. FIG. 3F shows the identified or recovered vibration noise using an exemplary method (i.e., discussed above with respect to FIGS. 3A and/or 3B), along with a bandpass filter (BPF), versus the applied vibration for the 1.7 ns/nm CD case. As shown in FIG. 3F, applying a BPF that exactly covers the bandwidth of the applied vibration improves the SNR to 3.3 dB. FIG. 3G shows the identified or recovered vibration noise using only a BPF versus the applied vibration for the 1.7 ns/nm CD case. As shown in FIG. 3G, this yields only an SNR −8.5 dB due to the phase noise. The exemplary method thus provides an 11.8 dB SNR improvement as compared to a mere BPF, which can only filter out out-of-band noise.

Figure 3H:
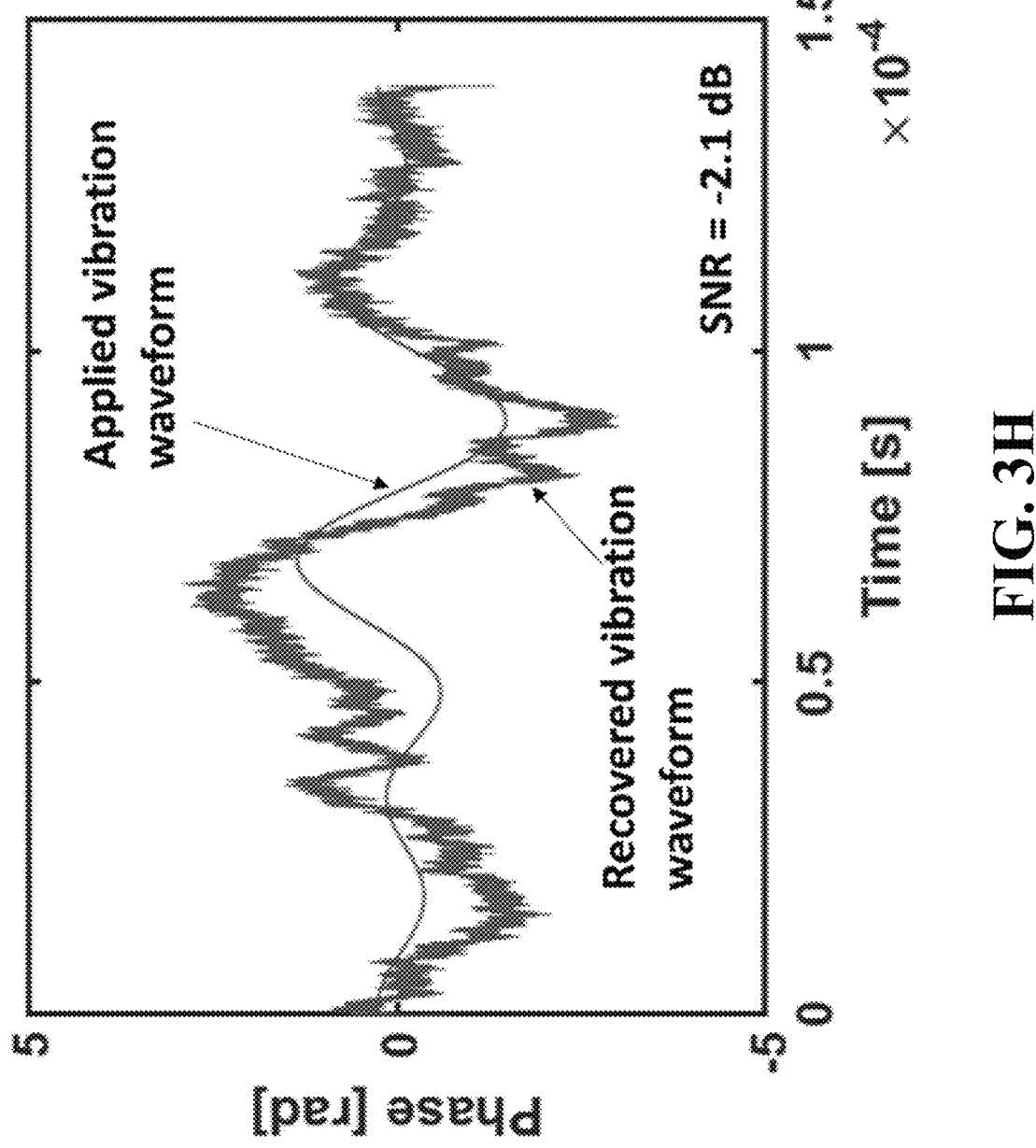
Figure 3I:
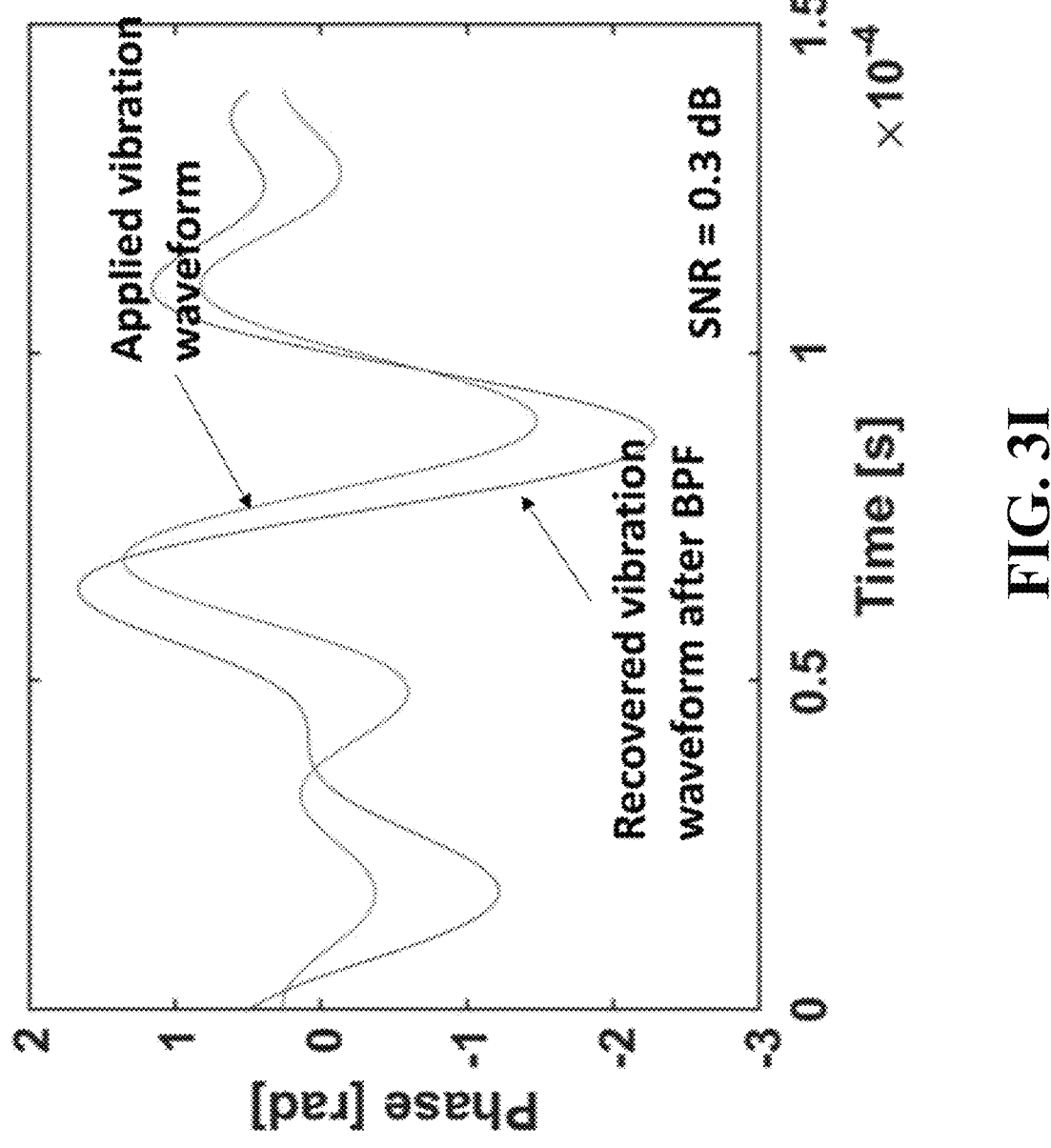
Figure 3J:
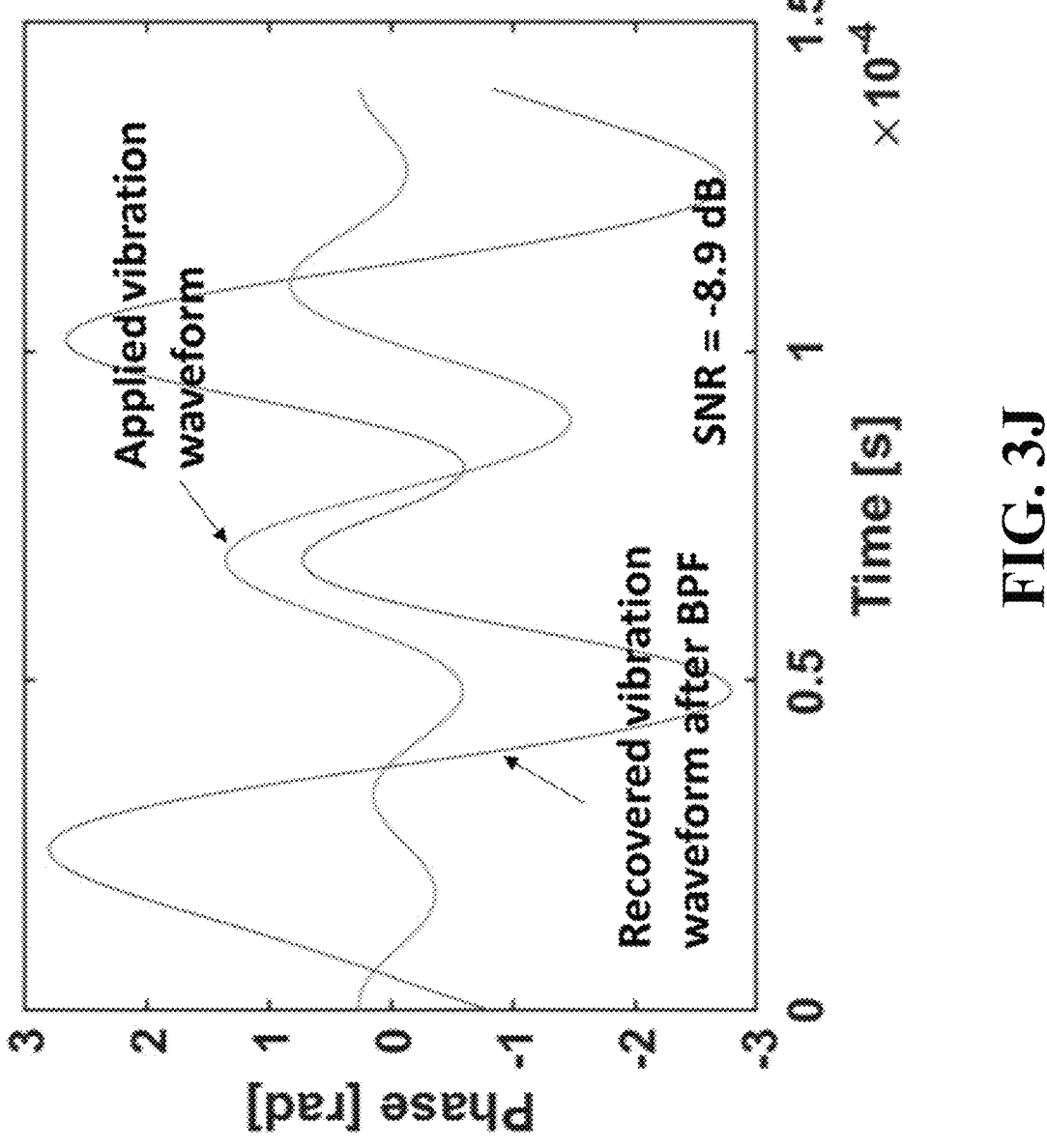

FIG. 3H shows the identified or recovered vibration noise using an exemplary method (i.e., discussed above with respect to FIGS. 3A and/or 3B) versus the applied vibration for the 102 ns/nm CD case, FIG. 3I shows the identified or recovered vibration noise using an exemplary method (i.e., discussed above with respect to FIGS. 3A and/or 3B), along with a BPF, versus the applied vibration for the 102 ns/nm CD case, and FIG. 3J shows the identified or recovered vibration noise using only a BPF versus the applied vibration for the 102 ns/nm CD case. As can be seen in FIGS. 3H to 3J, in the case of 102 ns/nm CD, the exemplary method can still estimate the Tx laser phase noise, enabling a 9.2 dB vibration SNR improvement.

Figure 4A:
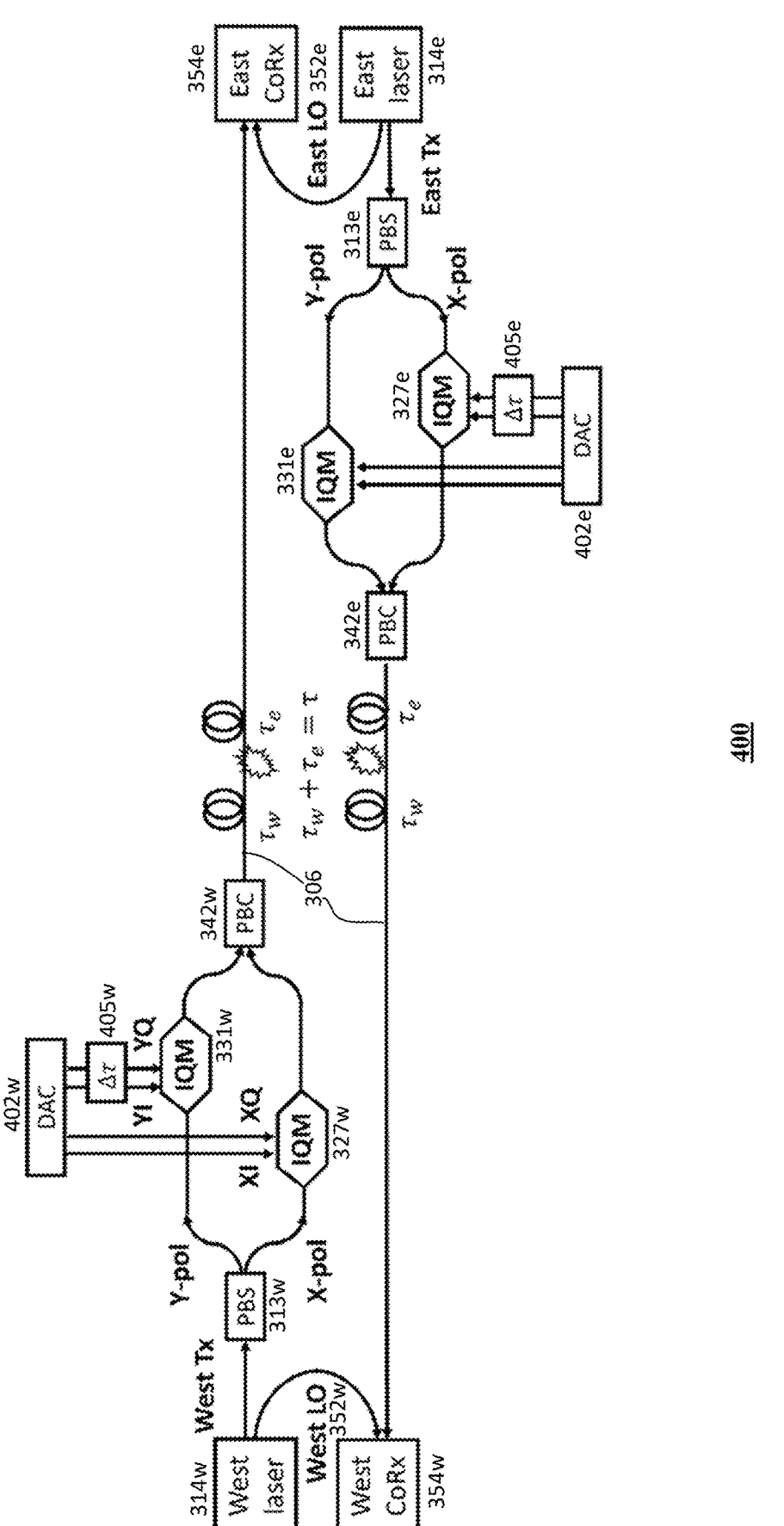
FIG. 4A is a block diagram of an example, non-limiting bi-directional optical communication system in which delays are implemented in the analog domain.

Example embodiments discussed above involve delays that are implemented in the optical domain. In some embodiments, a delay may additionally or alternatively be implemented in the electrical domain. For instance, in one or more embodiments, the delay may be implemented in the analog domain after waveform generation. FIG. 4A is a block diagram of an example, non-limiting bi-directional optical communication system 400 in which delays are implemented in the analog domain. System 400 may be similar to the system 300 of FIG. 3A, but where a delay 405*w* is implemented in the West transponder on the YI and YQ waveforms between a DAC 402*w* and the IQM 331*w*, and where a delay 405*e* is implemented in the East transponder on the XI and XQ waveforms between a DAC 402*e* and the IQM 327*e*. This example illustrates that the time delay may be implemented for either the X polarization or the Y polarization. With electrically delayed PDM at the transmitters, each receiver may, similar to the system 300 of FIG. 3A, include CPR functionalities that independently track polarization phases based on sync symbols or frequency pilot tones.

In one or more alternate embodiments, the delay may be implemented on polarization data drive instructions. For instance, the delay may be implemented in the digital sample domain on instructions that are sent to the DAC.

It will be understood and appreciated that the equations/ process described above with respect to system 300 of FIG. 3A may similarly apply in the alternative systems that implement delays in the electrical domain.

Figure 4B:
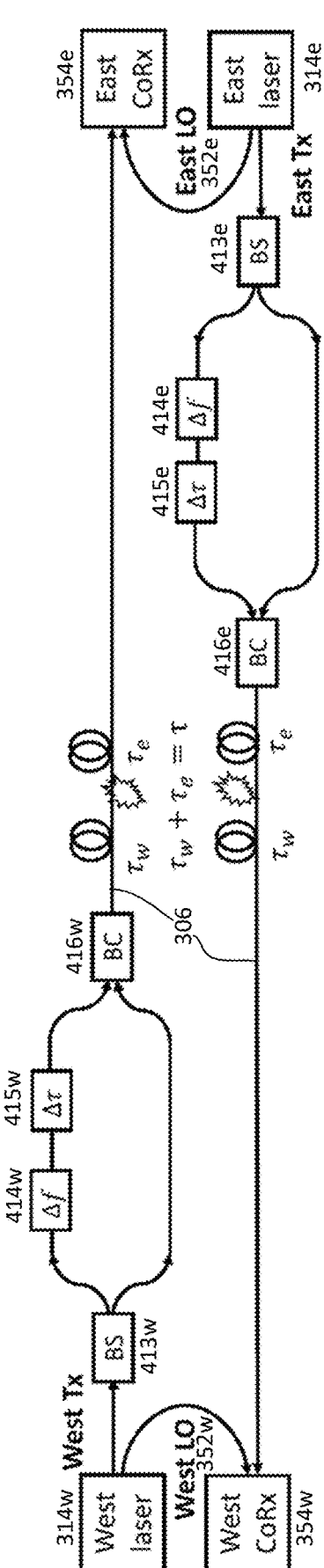
FIG. 4B is a block diagram of an example, non-limiting bi-directional optical communication system in which delays are implemented between optically-generated carrier frequencies in the transmitters, without telecom data transmissions.

In some embodiments, the delay may be implemented between different carrier frequencies at the transmitter. FIG. 4B is a block diagram of an example, non-limiting bi-directional optical communication system 410 in which delays are implemented between optically generated carrier frequencies in the transmitters, without telecom data transmissions.

System 410 may be similar to the system 300 of FIG. 3A, but where the delay is introduced in the frequency domain rather than in the polarization domain. More particularly, as depicted, a beam splitter (BS) 413$w$ may split a laser signal into two paths, where one path of light experiences a frequency shift 414$w$ (e.g., implemented in any suitable manner, such as by way of an IQ modulator, optical coordinate rotation digital computer (CORDIC), and/or the like) and a time delay 415$w$ compared to the other path of light, and where light in the two paths are combined by a beam combiner (BC) 416$w$ prior to being launched into the fiber link 306. In the other transmitter, a BS 413$e$ may split a laser signal into two paths, where one path of light experiences a frequency shift 414$e$ and a time delay 415$e$ compared to the other path of light, and where light in the two paths are combined by a BC 416$e$ prior to being launched into the fiber link 306. In various embodiments, the amount of each of the frequency shifts 414$w$ and 414$e$ may be such that the input frequency and the shifted output frequency are orthogonal or substantially orthogonal to one another. Any two distinct frequencies may be orthogonal. In particular, two frequencies may be considered orthogonal if their frequency separation is a number of times greater than the reciprocal of the time interval over which they are required to be functionally distinct (i.e., property extraction time interval). That is, any two different single frequencies may be orthogonal as long as they remain distinct over the property extraction interval. In a case where the two frequencies are different or distinct over most of the property extraction interval (e.g., 70% of the interval, 80% of the interval, 90% of the interval, 95% of the interval etc., but not an entirety of the interval), the two frequencies may be considered substantially orthogonal. In system 410, each coherent receiver 354$w$, 354$e$, including a 90-degree hybrid and an LO laser, may detect received intermediate frequencies and independently track the phases of the two intermediate frequencies (e.g., of either non-faded polarization of two polarizations of light). The transmitter laser phase noise from the difference between two tracked intermediate frequency phases may be obtained or retrieved by applying an inverse of the transfer function of an FIR filter based on the applied time delay between the two carrier frequencies at the transmitter. In various embodiments, given that carrier frequencies are involved here rather than different polarizations, the CPR functionality at each coherent receiver 354$w$, 354$e$ may not necessarily be the same as that described above with respect to system 300 of FIG. 3A, but may nevertheless be configured to independently extract a phase of each optical carrier. In any case, the transmitter laser phase noise for the other transmission direction may be similarly obtained or retrieved. The obtained estimates of laser phase noise contributions may then be removed from the total phase for each direction to determine a (e.g., acoustic) vibration-induced phase change, thereby improving disturbance detection sensitivity and localization.

The following example optical field equations (and example equations derived therefrom for estimating the phase noises contributed by both lasers) may apply for the implementation shown in FIG. 4B.

For one carrier frequency, i.e., frequency $f_1$;

$$E_{1,e}(t) = (A_e(t)) \cdot e^{(j2\pi f_1 t + \varphi_{vib}(t-\tau_e) + \varphi_{Lw}(t-\tau) - \varphi_{Le}(t) + \varphi_{1,n,e}(t))}$$

and $$E_{1,w}(t) = (A_w(t)) \cdot e^{(j2\pi f_1 t + \varphi_{vib}(t-\tau_w) + \varphi_{Le}(t-\tau) - \varphi_{Lw}(t) + \varphi_{1,n,w}(t))}.$$

For a second carrier frequency, i.e., frequency $f_2 = f_1 + \Delta f$:

$$E_{2,e}(t) = (A_e(t)) \cdot e^{(j2\pi f_2 t + \varphi_{vib}(t-\tau_e) + \varphi_{Lw}(t-\tau-\Delta\tau) - \varphi_{Le}(t) + \varphi_{2,n,e}(t))}$$

and $$E_{2,w}(t) = (A_w(t)) \cdot e^{(j2\pi f_2 t + \varphi_{vib}(t-\tau_w) + \varphi_{Le}(t-\tau-\Delta\tau) - \varphi_{Lw}(t) + \varphi_{2,n,w}(t))}.$$

If the CPR block is engineered or designed in a way to provide independent phase estimates of the intermediate frequencies $f_{IF1} = f_1 - f_{LO}$ and $f_{IF2} = f_2 - f_{LO}$, where $f_{LO}$ is the frequency of the local oscillator laser, by performing a subtraction operation on the two independent phase estimates, the following equation can be obtained:

$$\Delta\theta_{f_{IF_1} - f_{IF_2}, e}[n] = \varphi_{Lw}[n-N] - \varphi_{Lw}[n-N-\Delta N] + (\varphi'_{1,n,e}[n] - \varphi'_{2,n,e}[n])$$

and $$\Delta\theta_{f_{IF_1} - f_{IF_2}, w}[n] = \varphi_{Le}[n-N] - \varphi_{Le}[n-N-\Delta N] + (\varphi'_{1,n,w}[n] - \varphi'_{2,n,w}[n]).$$

Here, $\varphi_{vib}(t-\tau_w)$, $\varphi_{vib}(t-\tau_e)$ represent the vibration-phase record; $\varphi_{Lw}(t)$, $\varphi_{Le}(t)$, $\varphi_{Lw}(t-\tau)$, $\varphi_{Le}(t-\tau)$ represent the laser phase noise for the West and East lasers and their delayed versions; and $\varphi_{1,n,e}(t)$, $\varphi_{1,n,e}(t)$, $\varphi_{2,n,w}(t)$, $\varphi_{2,n,e}(t)$ represent the accumulated phase noise at the West and East ends, excluding the laser phase noises, and originated by, for instance, inline EDFAs, fiber nonlinearities, transceivers, and so on (assuming that they follow AWGN distribution). $\varphi_{1,n,e}'[n]$, $\varphi_{2,n,e}'[n]$, $\varphi_{1,n,w}'[n]$, and $\varphi_{2,n,w}'[n]$ represent accumulated phase noise contribution excluding the lasers' phase noises after the action of CPR. The amplitude terms Ae and Aw may simply be set to 1 in a case where there is no telecom data transmission. These amplitude terms may otherwise vary in a case where there is telecom data (e.g., FIG. 4C below).

Figure 4C:
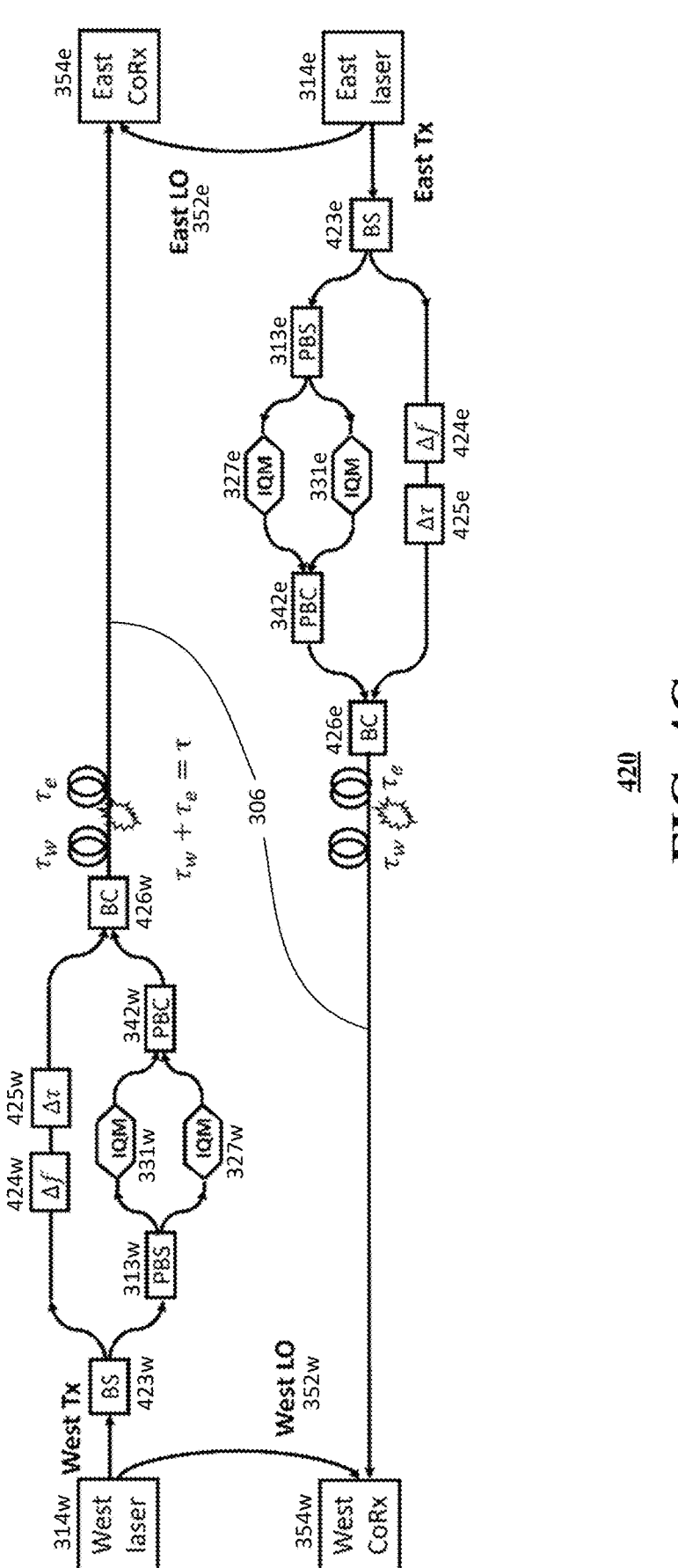
FIG. 4C is a block diagram of an example, non-limiting bi-directional optical communication system in which delays are implemented between optically-generated carrier frequencies in the transmitters, with telecom data transmissions.

FIG. 4C is a block diagram of an example, non-limiting bi-directional optical communication system 420 in which delays are implemented between optically-generated carrier frequencies in the transmitters, with telecom data transmissions.

In one or more alternate embodiments, the delay may be implemented on frequency division multiplexed drive instructions. For instance, the delay may be implemented in the digital sample domain on instructions that are sent to the DAC. It will be understood and appreciated that the equations/process described above with respect to system 420 of FIG. 4C may similarly apply in the alternative systems that implement delays in the electrical domain.

System 420 may include aspects of the system 300 of FIG. 3A and the system 410 of FIG. 4B. As depicted in FIG. 4C, a BS 423$w$ may split a laser signal into two paths, where one path of light experiences a frequency shift 424$w$ and a time delay 425$w$, where the other path of light is split into two polarizations that undergo electro-optic data modulation with no optical delay, and where light in the two major paths are combined by a BC 426$w$ prior to being launched into the fiber link 306. In the other transmitter, a BS 423$e$ may split a laser signal into two paths, where one path of light experiences a frequency shift 424$e$ and a time delay 425$e$, where the other path of light is split into two polarizations that undergo electro-optic data modulation with no optical delay, and where light in the two major paths are combined by a BC 426$e$ prior to being launched into the fiber link 306. Similar to the system 410 of FIG. 4B, each coherent receiver 354w, 354e in the system 420, including a 90-degree hybrid and an LO laser, may detect received intermediate frequencies and independently track the phases of the two intermediate frequencies. The transmitter laser phase noise from the difference between the two tracked intermediate frequency phases may be obtained or retrieved by applying an inverse of the transfer function of an FIR filter based on the applied time delay between the two carrier frequencies at the transmitter. The transmitter laser phase noise for the other transmission direction may be similarly obtained or retrieved. The obtained estimates of laser phase noise contributions may then be removed from the total phase for each direction to determine a (e.g., acoustic) vibration-induced phase change, thereby improving disturbance detection sensitivity and localization.

Figure 4D:
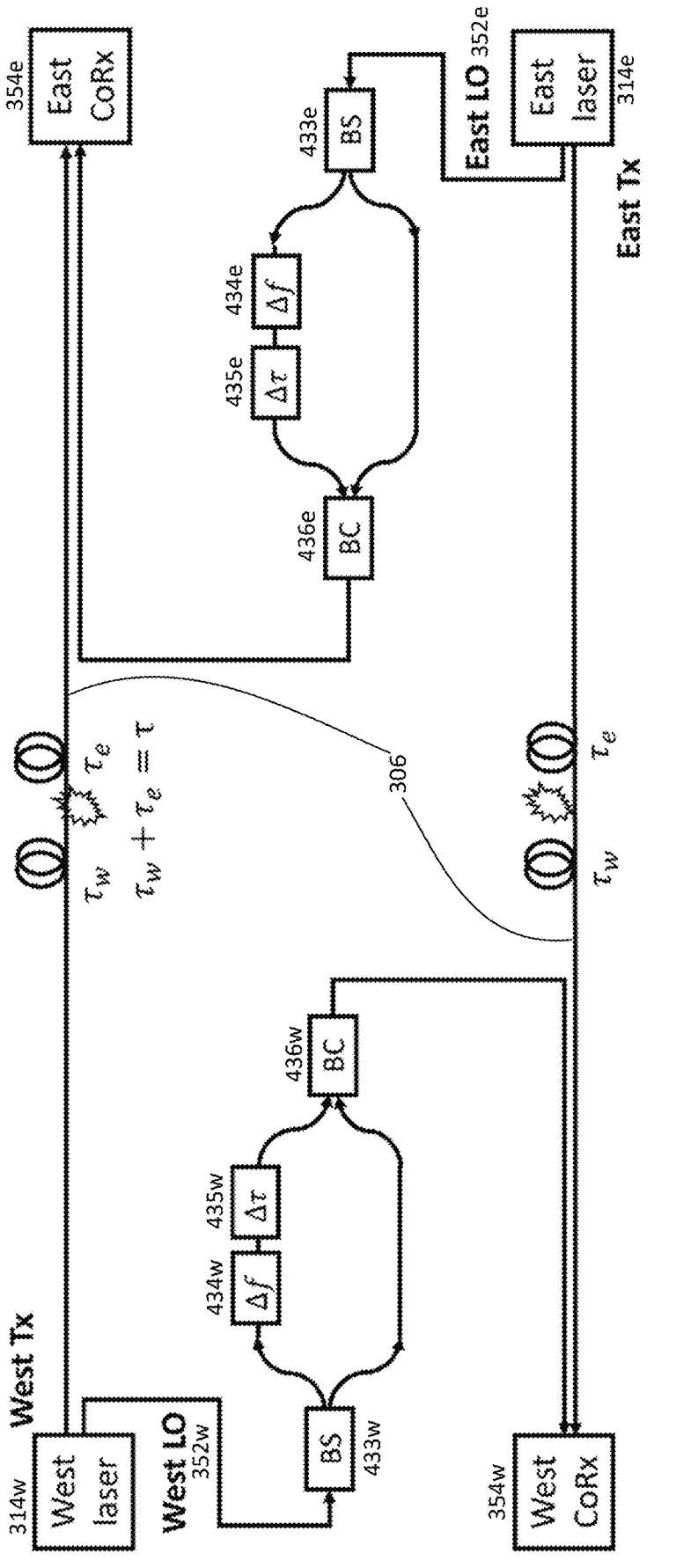
FIG. 4D is a block diagram of an example, non-limiting bi-directional optical communication system in which delays are implemented between optically-generated LO carrier frequencies, without telecom data transmissions.

FIG. 4D is a block diagram of an example, non-limiting bi-directional optical communication system 430 in which delays are implemented between optically-generated LO carrier frequencies, without telecom data transmissions.

As depicted, a BS 433w may split a receive-end CW LO laser output 352w into two paths, where one path of light experiences a frequency shift 434w and a time delay 435w compared to the other path of light, and where light in the two paths are combined by a BC 436w. On the other end, a BS 433e may split a receive-end CW LO laser output 352e into two paths, where one path of light experiences a frequency shift 434e and a time delay 435e compared to the other path of light, and where light in the two paths are combined by a BC 436e. Each coherent receiver 354w, 354e in the system 430 may include a 90-degree hybrid, and may detect the two intermediate frequencies and independently track the phases of the two intermediate frequencies (e.g., of either non-faded polarization of two polarizations of light). The receiver (or LO) laser phase noise from the difference between the two tracked intermediate frequency phases may be obtained or retrieved by applying an inverse of the transfer function of an FIR filter based on the applied time delay between the two carrier frequencies at the receiver. The receiver (or LO) laser phase noise may be obtained or retrieved similarly for the other transmission direction. The obtained estimates of laser phase noise contributions may then be removed from the total phase for each direction to determine a (e.g., acoustic) vibration-induced phase change, thereby improving disturbance detection sensitivity and localization.

The following example optical field equations (and example equations derived therefrom for estimating the phase noises contributed by both lasers) may apply for the implementation shown in FIG. 4D.

For one carrier frequency, i.e., frequency $f_1$:

$$E_{1,e}(t) = e^{\left(j2\pi f_1 t + \varphi_{vib}(t-\tau_e) + \varphi_{Lw}(t-\tau) - \varphi_{Le}(t) + \varphi_{1,n,e}(t)\right)}$$

and $$E_{1,w}(t) = e^{\left(j2\pi f_1 t + \varphi_{vib}(t-\tau_w) + \varphi_{Le}(t-\tau) - \varphi_{Lw}(t) + \varphi_{1,n,w}(t)\right)}.$$

For a second carrier frequency, i.e., frequency $f_2 = f_1 + \Delta f$:

$$E_{2,e}(t) = e^{\left(j2\pi f_2 t + \varphi_{vib}(t-\tau_e) + \varphi_{Lw}(t-\tau) - \varphi_{Le}(t-\Delta\tau) + \varphi_{2,n,e}(t)\right)}$$

and $$E_{2,w}(t) = e^{\left(j2\pi f_2 t + \varphi_{vib}(t-\tau_w) + \varphi_{Le}(t-\tau-\Delta\tau) - \varphi_{Lw}(t-\Delta\tau) + \varphi_{2,n,w}(t)\right)}.$$

If the CPR block is engineered or designed in a way to provide independent phase estimates of $f_{IF1} = f_1 - f_{LO}$ and $f_{IF2} = f_{LO}$ intermediate frequencies, by performing a subtraction operation on the two independent phase estimates, the following equation can be obtained:

$$\Delta\theta_{f_{IF_1}-f_{IF_2},e}[n] = -\varphi_{Le}[n-N] + \varphi_{Le}[n-N-\Delta N] + \left(\varphi'_{1,n,e}[n] - \varphi'_{2,n,e}[n]\right)$$

and $$\Delta\theta_{f_{IF_1}-f_{IF_2},w}[n] = -\varphi_{Lw}[n-N] + \varphi_{Lw}[n-N-\Delta N] + \left(\varphi'_{1,n,w}[n] - \varphi'_{2,n,w}[n]\right).$$

Thus far, bi-directional optical communication systems, where delayed dual-polarization or multi-tone implementations (whether with or without telecom data) are used to facilitate improved disturbance detection and localization, have been described. The following are brief descriptions of various loop-back configurations that can be employed to similarly facilitate improved disturbance detection and localization.

Figure 4E:
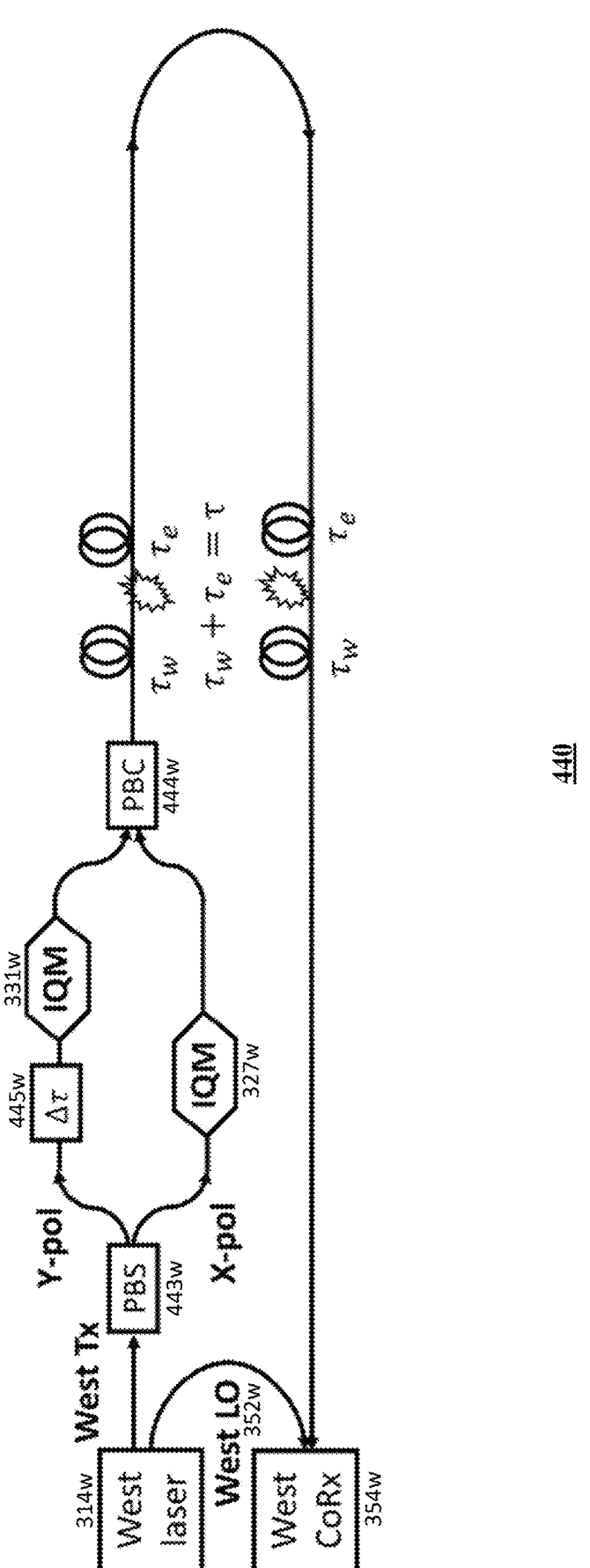
FIG. 4E is a block diagram of an example, non-limiting loop-back optical communication system with optically-delayed polarizations at the transmitter, without telecom data transmissions and with independent tracking of polarization phases in carrier phase recovery (CPR) based on sync symbols or frequency pilot tones.

FIG. 4E is a block diagram of an example, non-limiting loop-back optical communication system 440 with optically-delayed polarizations at the transmitter, without telecom data transmissions and with independent tracking of polarization phases in CPR based on sync symbols or frequency pilot tones. In this homodyne loop-back configuration, a coherent transponder (e.g., with transmitter 314w, receiver 354w) can relieve the requirements of time synchronization that are otherwise required for two coherent transceivers that are located apart from one another. As depicted, an optical delay 445w may be provided at the transmitter of the transponder—i.e., for the Y polarization between a PBS 443w and a PBC 444w. Since both fiber pairs of the link are placed closely together, often within the same cable, two rather similar phase change patterns will occur in the case of a disturbance event. Localization of such vibration may be achieved by calculating the time delay between the two phase patterns using correlation operations. Removing the estimate of the laser phase noise contribution from the total phase can provided improved disturbance detection sensitivity and localization as compared to conventional methods. The following example optical field equations (and example equation derived therefrom for estimating the phase noise contributed by the laser) may apply for the implementation shown in FIG. 4E:

$$E_{Xw}(t) =$$

$$\left\{\left(A_{Xew}(t)e^{\left(j2\pi f_w t + \varphi_{vib}(t-2\tau_e-\tau_w) + \varphi_{vib}(t-\tau_w) - \varphi_{Lw}(t-\tau) + \varphi_{X,n,w}(t)\right)}\right)\right\} \cdot e^{-\left(j2\pi f_w t + \varphi_{Lw}(t)\right)},$$

$$E_{Yw}(t) = \left\{\left(A_{Yew}(t)e^{\left(j2\pi f_w t + \varphi_{vib}(t-2\tau_e-\tau_w) + \varphi_{vib}(t-\tau_w) - \varphi_{Lw}(t-\tau-\Delta\tau) + \varphi_{Y,n,w}(t)\right)}\right)\right\} \cdot$$

$$e^{-\left(j2\pi f_w t + \varphi_{Lw}(t)\right)},$$

If the CPR block is engineered or designed in a way to provide independent phase estimates of X and Y polarizations, by performing a subtraction operation on the two independent phase estimates, the following equation can be obtained:

$$\Delta\theta_{X-Y,w}[n] = \varphi_{Lw}[n-N] - \varphi_{Lw}[n-N-\Delta N] + \left(\varphi'_{X,n,w}[n] - \varphi'_{Y,n,w}[n]\right).$$

Figure 4F:
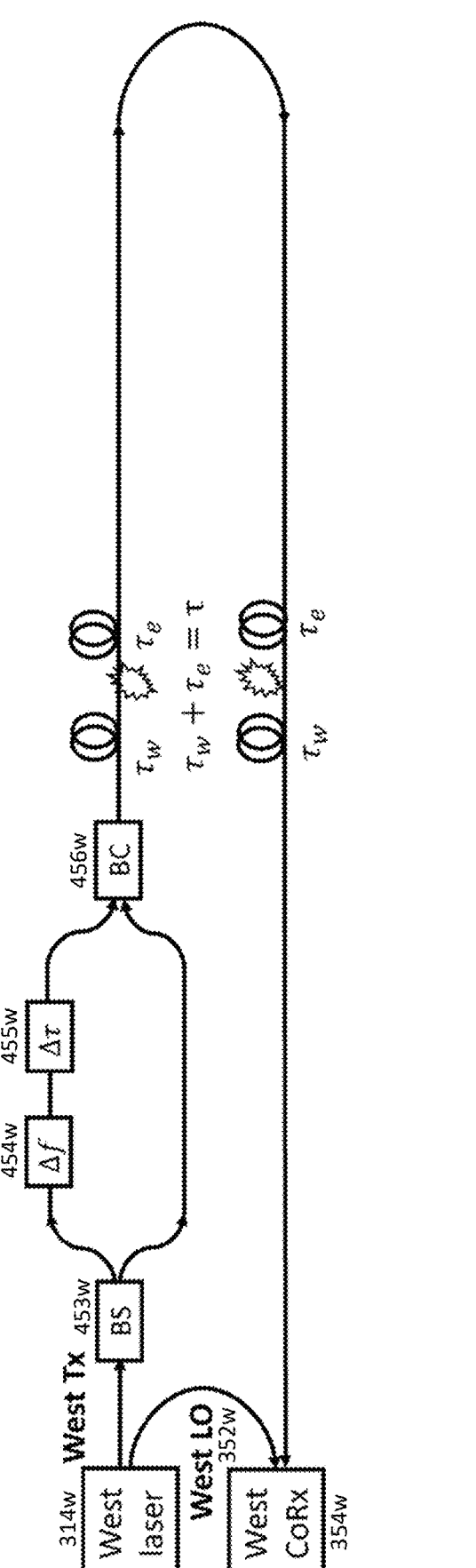
FIG. 4F is a block diagram of an example, non-limiting loop-back optical communication system with optically-delayed carrier frequencies at the transmitter, without telecom data transmissions and with independent tracking of intermediate frequency phases.

FIG. 4F is a block diagram of an example, non-limiting loop-back optical communication system 450 with optically-delayed carrier frequencies at the transmitter, without telecom data transmissions and with independent tracking of intermediate frequency phases. In this homodyne loop-back configuration, a coherent transponder (e.g., with transmitter 314w, receiver 354w) can similarly relieve the requirements of time synchronization that are otherwise required for two coherent transceivers that are located apart from one another. As depicted, a BS 453w may split a laser signal into two paths, where one path of light experiences a frequency shift 454w (e.g., implemented in any suitable manner, such as by way of an IQ modulator, optical CORDIC, and/or the like) and a time delay 455w compared to the other path of light, and where light in the two paths are combined by a BC 456w prior to being launched into the link. Since both fiber pairs of the link are placed closely together, often within the same cable, two rather similar phase change patterns will occur in the case of a disturbance event. Localization of such vibration may be achieved by calculating the time delay between the two-phase patterns using correlation operations. Removing the estimate of the laser phase noise contribution from the total phase can provided improved disturbance detection sensitivity and localization as compared to conventional methods. The following example optical field equations (and example equation derived therefrom for estimating the phase noise contributed by the laser) may apply for the implementation shown in FIG. 4F:

$$E_{1,w}(t) = e^{\left(j2\pi f_1 t + \varphi_{vib}(t - 2\tau_e - \tau_w) + \varphi_{vib}(t - \tau_w) + \varphi_{Lw}(t - \tau) - \varphi_{Lw}(t) + \varphi_{1,n,w}(t)\right)},$$

$$E_{2,w}(t) = e^{\left(j2\pi f_2 t + \varphi_{vib}(t - 2\tau_e - \tau_w) + \varphi_{vib}(t - \tau_w) + \varphi_{Lw}(t - \tau - \Delta\tau) - \varphi_{Lw}(t) + \varphi_{2,n,w}(t)\right)},$$

If the CPR block is engineered or designed in a way to provide independent phase estimates of $f_{IF1} = f_1 - f_{LO}$ and $f_{IF2} = f_2 - f_{LO}$ intermediate frequencies, by performing a subtraction operation on the two independent phase estimates, the following equation can be obtained $$\Delta\theta_{f_{IF_1} - f_{IF_2}, w}[n] = \varphi_{Lw}[n - N] - \varphi_{Lw}[n - N - \Delta N] + \left(\varphi'_{1,n,w}[n] - \varphi'_{2,n,w}[n]\right).$$

Figure 4G:
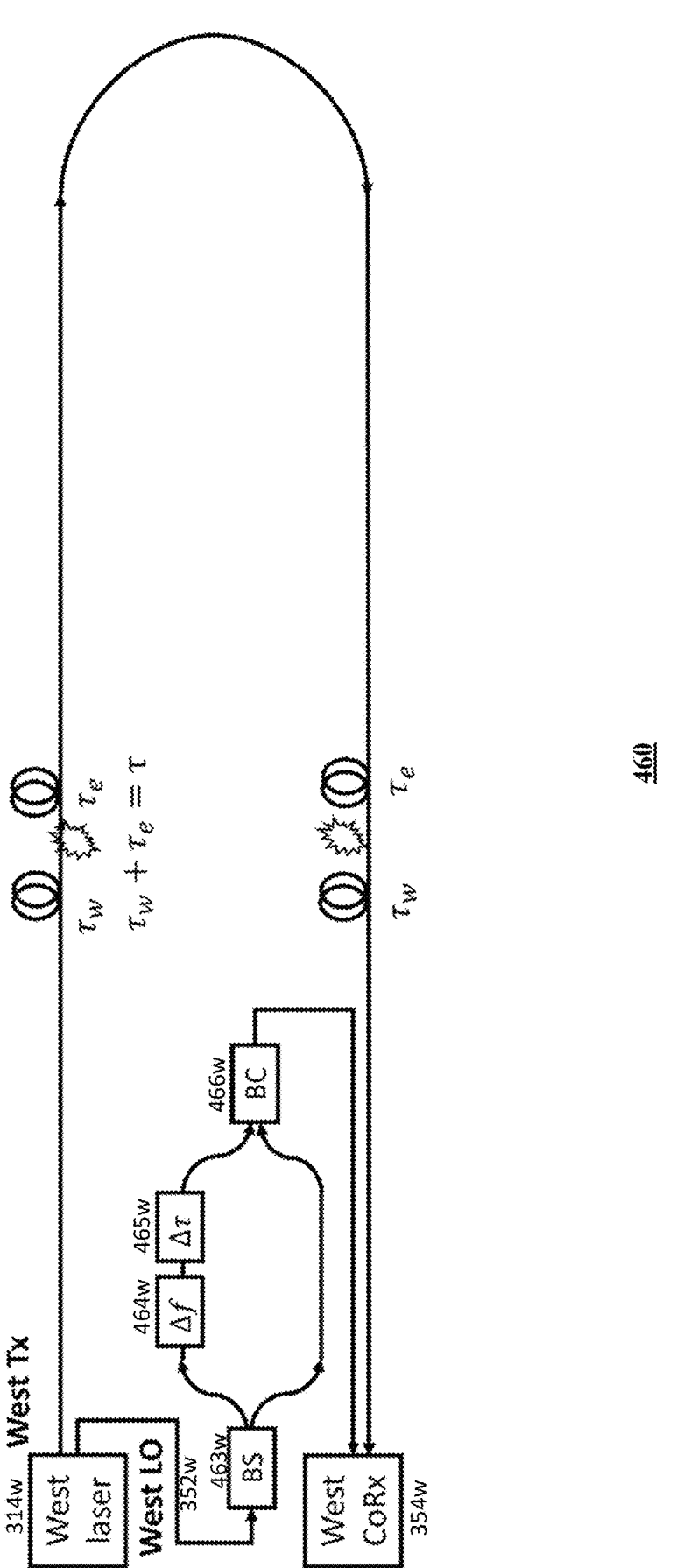
FIG. 4G is a block diagram of an example, non-limiting loop-back optical communication system with optically-delayed LO carrier frequencies, without telecom data transmissions and with independent tracking of intermediate frequency phases.

FIG. 4G is a block diagram of an example, non-limiting loop-back optical communication system 460 with optically-delayed LO carrier frequencies, without telecom data transmissions and with independent tracking of intermediate frequency phases. In this homodyne loop-back configuration, a coherent transponder (e.g., with transmitter 314w, receiver 354w) can similarly relieve the requirements of time synchronization that are otherwise required for two coherent transceivers that are located apart from one another. As depicted, a BS 463w may split a receive-end CW LO laser output 352w into two paths, where one path of light experiences a frequency shift 464w and a time delay 465w compared to the other path of light, and where light in the two paths are combined by a BC 466w. Since both fiber pairs of the link are placed closely together, often within the same cable, two rather similar phase change patterns will occur in the case of a disturbance event. Localization of such vibration may be achieved by calculating the time delay between the two phase patterns using correlation operations. Removing the estimate of the laser phase noise contribution from the total phase can provided improved disturbance detection sensitivity and localization as compared to conventional methods. The following example optical field equations (and example equation derived therefrom for estimating the phase noise contributed by the laser) may apply for the implementation shown in FIG. 4G:

$$E_{1,w}(t) = e^{\left(j2\pi f_1 t + \varphi_{vib}(t - 2\tau_e - \tau_w) + \varphi_{vib}(t - \tau_w) + \varphi_{Lw}(t - \tau) - \varphi_{Lw}(t) + \varphi_{1,n,w}(t)\right)},$$

$$E_{2,w}(t) = e^{\left(j2\pi f_2 t + \varphi_{vib}(t - 2\tau_e - \tau_w) + \varphi_{vib}(t - \tau_w) + \varphi_{Lw}(t - \tau) - \varphi_{Lw}(t - \Delta\tau) + \varphi_{2,n,w}(t)\right)},$$

If the CPR block is engineered or designed in a way to provide independent phase estimates of $f_{IF1} = f_1 - f_{LO}$ and $f_{IF2} = f_2 - f_{LO}$ intermediate frequencies, by performing a subtraction operation on the two independent phase estimates, the following equation can be obtained:

$$\Delta\theta_{f_{IF_1} - f_{IF_2}, w}[n] = -\varphi_{Lw}[n] + \varphi_{Lw}[n - \Delta N] + \left(\varphi'_{1,n,w}[n] - \varphi'_{2,n,w}[n]\right).$$

Figure 4H:
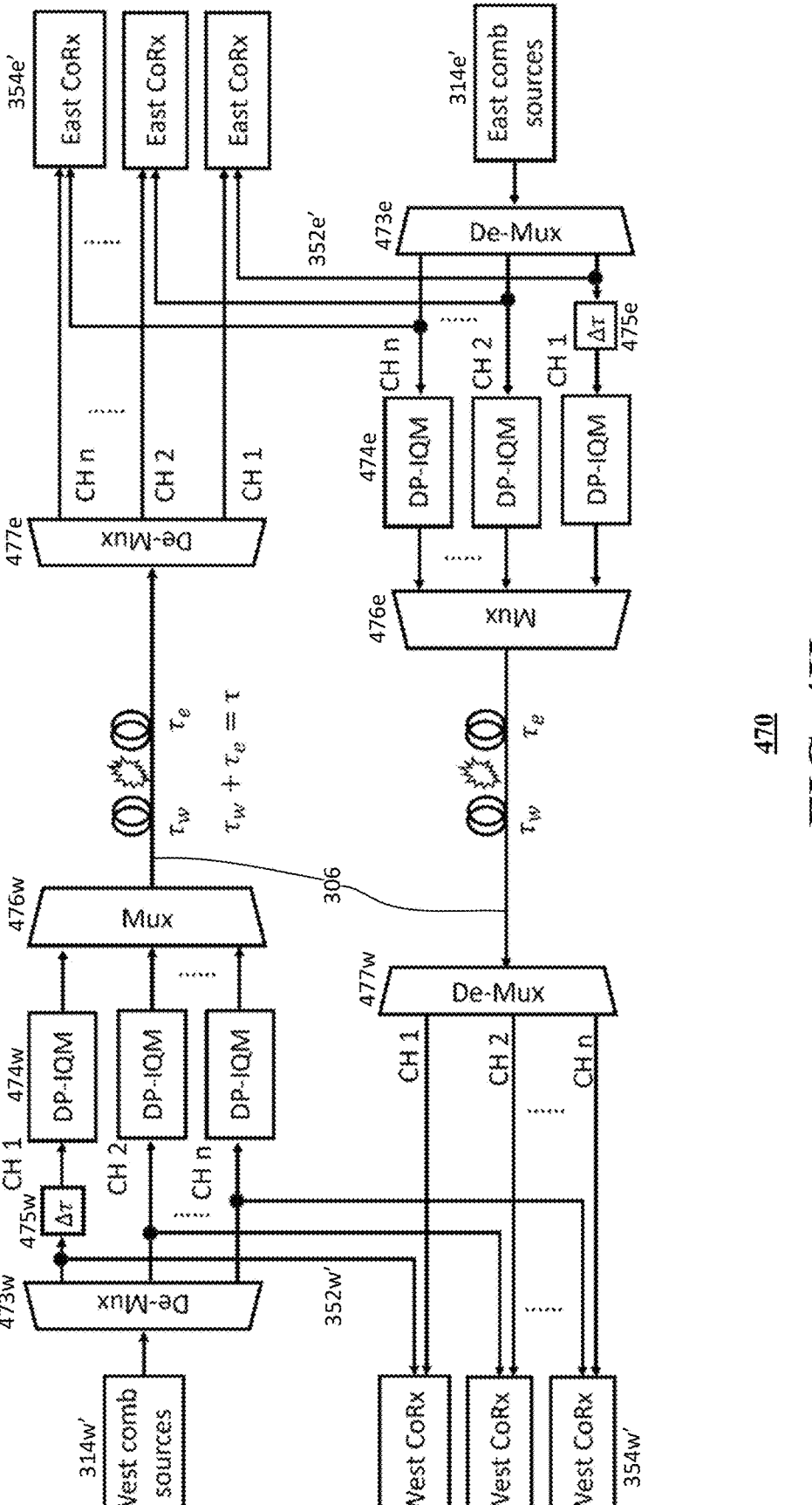
FIG. 4H is a block diagram of an example, non-limiting bi-directional optical communication system in which delays are implemented between transmit wavelengths of coherent (or sufficiently coherent) comb laser sources at transmitters prior to modulation, with telecom data transmissions and independent tracking of two or more wavelengths' phases in CPR of two or more transceivers based on sync symbols or frequency pilot tones.

In various embodiments, a delay may be installed, at a transmitter (or alternatively, at an LO), on one of the lines associated with a coherent (or sufficiently coherent) comb laser source that includes comb lines with (e.g., sufficiently) similar phase noise records prior to modulation. Such a delay can be leveraged by transceivers to extract the comb laser phase noise. FIG. 4H is a block diagram of an example, non-limiting bi-directional optical communication system 470 in which delays are implemented between transmit wavelengths of coherent (or sufficiently coherent) comb laser sources at transmitters prior to modulation, with telecom data transmissions and independent tracking of two or more wavelengths' phases in CPR of two or more transceivers based on sync symbols or frequency pilot tones. On one end, a West transponder may include a comb laser source 314w' that emits discrete wavelengths of light that are (e.g., substantially) phase-locked or mode-locked-hence a sufficiently coherent comb laser source. The West transponder may also include a de-multiplexer 473w that de-multiplexes the output of the comb laser source 314w', a set of dual polarization-IQMs 474w for receiving the de-multiplexer outputs, and a multiplexer 476w that combines all of the modulated signals into a single output onto a link 306. The West transponder may also include a set of receivers 354w' that respectively receive corresponding outputs of the de-multiplexer 473w (i.e., LO lasers 352w') as well as corresponding outputs of a de-multiplexer 477w that de-multiplexes signals received from the link 306. Further, the West transponder may include an installed delay 475w on one of the outputs of the de-multiplexer 473w that is fed to one of the DP-IQMs. On the other end, an East transponder may similarly include a comb laser source 314e' that emits discrete wavelengths of light that are (e.g., substantially) phase-locked or mode-locked, a de-multiplexer 473e that de-multiplexes the output of the comb laser source 314e', a set of dual polarization-IQMs 474e for receiving the de-multiplexer outputs, and a multiplexer 476e that combines all of the modulated signals into a single output onto the link 306. The East transponder may also similarly include a set of receivers 354e' that respectively receive corresponding outputs of the de-multiplexer 473e (i.e., LO lasers 352e') as well as corresponding outputs of a de-multiplexer 477e that de-multiplexes signals received from the link 306. Further, the East transponder may similarly include an installed delay 475e on one of the outputs of the de-multiplexer 473e that is fed to one of the DP-IQMs.

In an example operation of the implementation shown in FIG. 4H, at one transponder, the sufficiently coherent comb laser source at a transmitter may be de-multiplexed into two or more wavelength paths, where one of the wavelength paths experiences an optical delay compared to the rest of the wavelength paths. Electro-optical modulation may be applied to each wavelength path, where the two or more wavelength paths may then be combined into a wavelength-multiplexed optical signal that is sent into the fiber link. At the other transponder, received WDM optical signals may be demultiplexed into two or more wavelength paths, the wavelengths may be detected via two or more coherent receivers each including a 90-degree dual-polarization hybrid and an LO laser from the transponder's own sufficiently coherent comb laser source, and two or more wavelengths' phases may be tracked using CPR functionality associated with the two or more coherent receivers based on sync symbols or frequency pilot tones. The transmitter laser phase noise from the difference between two or more tracked wavelengths' phases may be obtained or retrieved by applying an inverse of the transfer function of an appropriate FIR filter based on the installed time delay between two or more wavelength paths at the transmitter. The receiving transponder's LO laser phase noise may also be obtained based on the other transmission direction. The obtained estimates of laser phase noise contributions may then be removed from the total phase for each direction to determine a (e.g., acoustic) vibration-induced phase change, thereby improving disturbance detection sensitivity and localization.

Figure 4I:
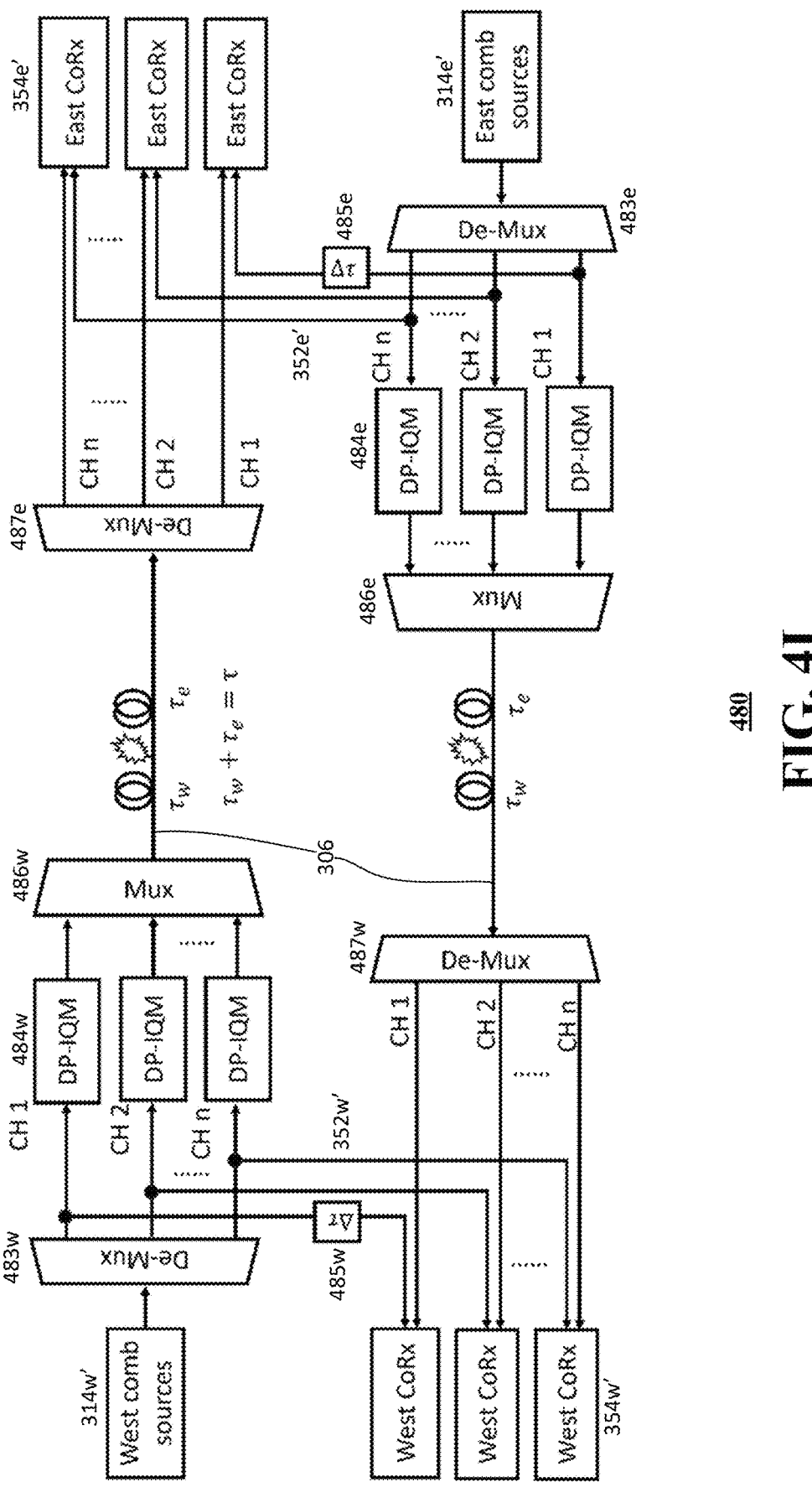
FIG. 4I is a block diagram of an example, non-limiting bi-directional optical communication system in which delays are implemented between LO wavelengths of coherent (or sufficiently coherent) comb laser sources at receivers, with telecom data transmissions and independent tracking of two or more wavelengths' phases in CPR of two or more transceivers based on sync symbols or frequency pilot tones.

FIG. 4I is a block diagram of an example, non-limiting bi-directional optical communication system 480 in which delays are implemented between LO wavelengths of coherent (or sufficiently coherent) comb laser sources at receivers, with telecom data transmissions and independent tracking of two or more wavelengths' phases in CPR of two or more transceivers based on sync symbols or frequency pilot tones. On one end, a West transponder may include a comb laser source 314$w'$ that emits discrete wavelengths of light that are (e.g., substantially) phase-locked or mode-locked-hence a sufficiently coherent comb laser source. The West transponder may also include a de-multiplexer 483$w$ that de-multiplexes the output of the comb laser source 314$w'$, a set of dual polarization-IQMs 484$w$ for receiving the demultiplexer outputs, and a multiplexer 486$w$ that combines all of the modulated signals into a single output onto a link 306. The West transponder may also include a set of receivers 354$w'$ that respectively receive corresponding outputs of the de-multiplexer 483$w$ (i.e., LO lasers 352$w'$) as well as corresponding outputs of a de-multiplexer 487$w$ that de-multiplexes signals received from the link 306. Further, the West transponder may include an installed delay 485$w$ in one of LO laser lines output from the de-multiplexer 483$w$. On the other end, an East transponder may similarly include a comb laser source 314$e'$ that emits discrete wavelengths of light that are (e.g., substantially) phase-locked or mode-locked, a de-multiplexer 483$e$ that de-multiplexes the output of the comb laser source 314$e'$, a set of dual polarization-IQMs 484$e$ for receiving the demultiplexer outputs, and a multiplexer 486$e$ that combines all of the modulated signals into a single output onto the link 306. The East transponder may also similarly include a set of receivers 354$e'$ that respectively receive corresponding outputs of the de-multiplexer 483$e$ (i.e., LO lasers 352$e'$) as well as corresponding outputs of a de-multiplexer 487$e$ that de-multiplexes signals received from the link 306. Further, the East transponder may similarly include an installed delay 485$e$ in one of LO laser lines output from the de-multiplexer 483$e$.

In an example operation of the implementation shown in FIG. 4I, at one transponder, the sufficiently coherent comb laser source may be demultiplexed into two or more wavelength paths for the two or more coherent receivers (each including a 90 degree dual-polarization hybrid), where one of the wavelength paths experiences an optical delay compared to the rest of the wavelength paths. Received WDM optical signals may be demultiplexed into two or more wavelength paths, the wavelengths may be detected via the two or more coherent receivers, and two or more wavelengths' phases may be tracked using CPR functionality associated with the two or more coherent receivers based on sync symbols or frequency pilot tones. The receiving transponder's LO laser phase noise from the difference between two or more tracked wavelengths' phases may be obtained or retrieved by applying an inverse of the transfer function of an appropriate FIR filter based on the installed time delay between two or more wavelength paths for the two or more coherent receivers. The transmitting transponder's transmitter laser phase noise may also be obtained based on the other transmission direction. The obtained estimates of laser phase noise contributions may then be removed from the total phase for each direction to determine a (e.g., acoustic) vibration-induced phase change, thereby improving disturbance detection sensitivity and localization.

It will be understood and appreciated that the arithmetic for estimating the laser phase noise contributions for the implementations shown in FIGS. 4H and 4I may be identical to that described above with respect to the optically-delayed/optically-shifted carrier frequency implementation (e.g., FIG. 4B), where $f_1$ and $f_2$ represent the frequencies of two different comb lines.

Figure 4J:
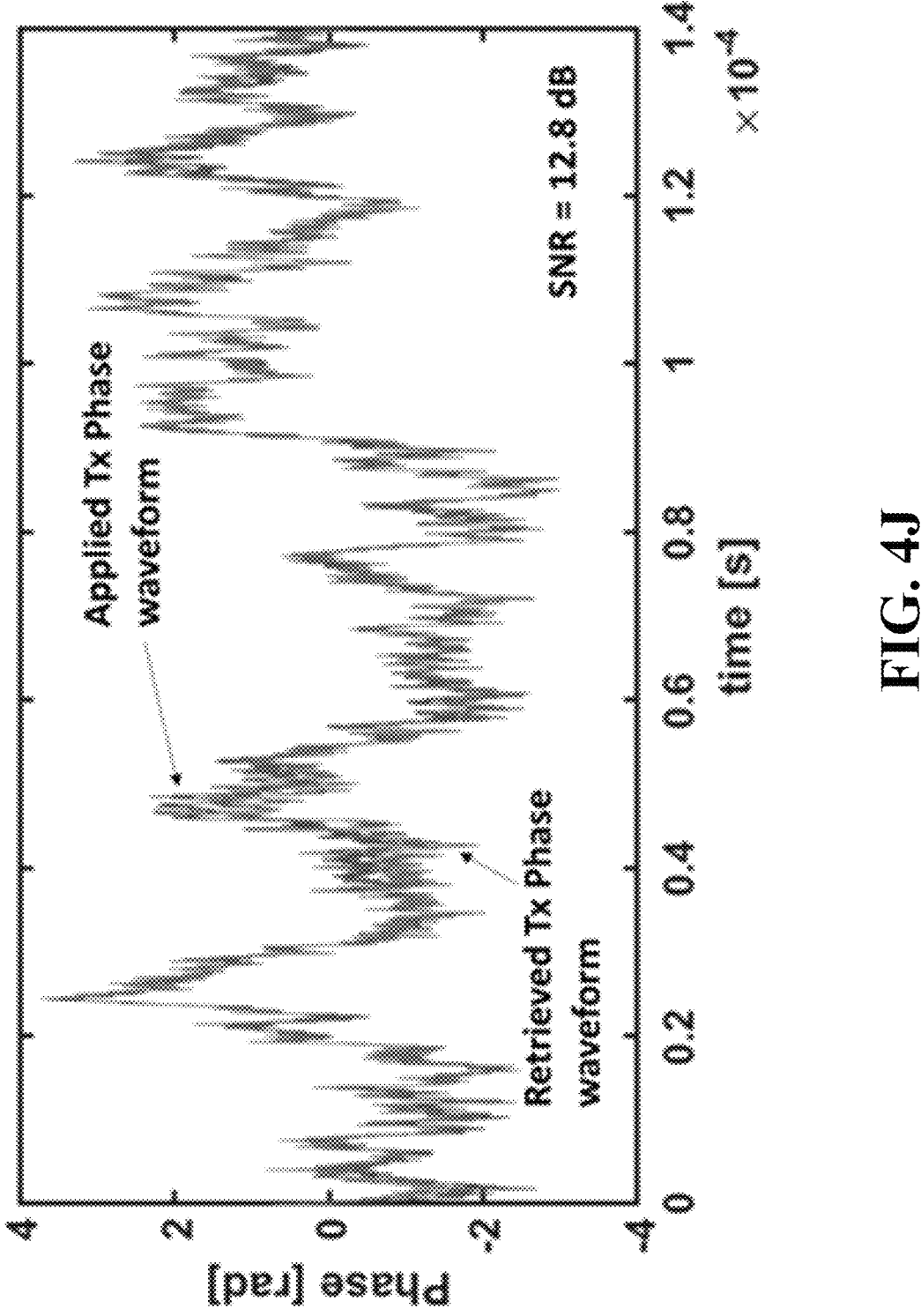
Figure 4K:
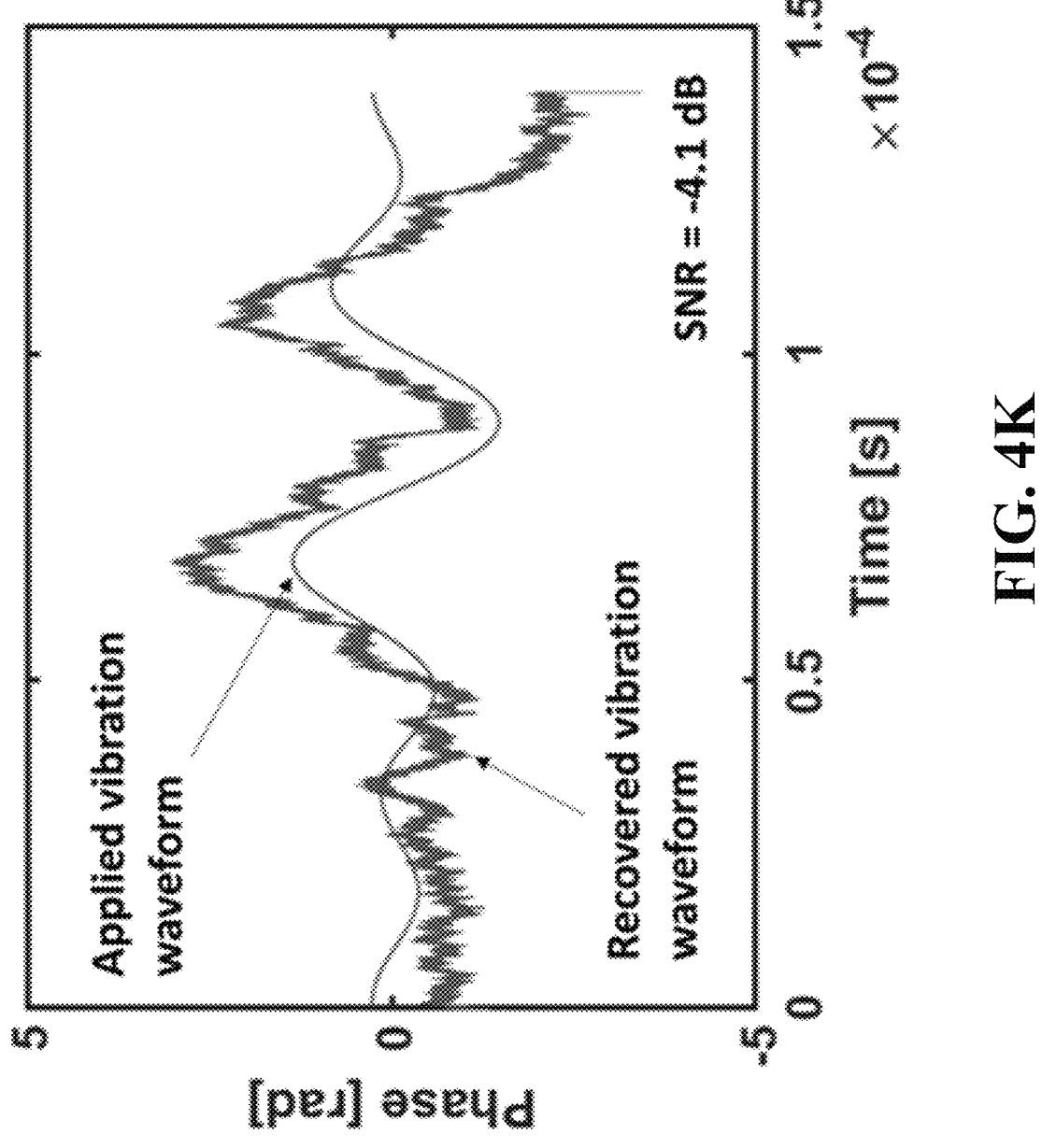
Figure 4L:
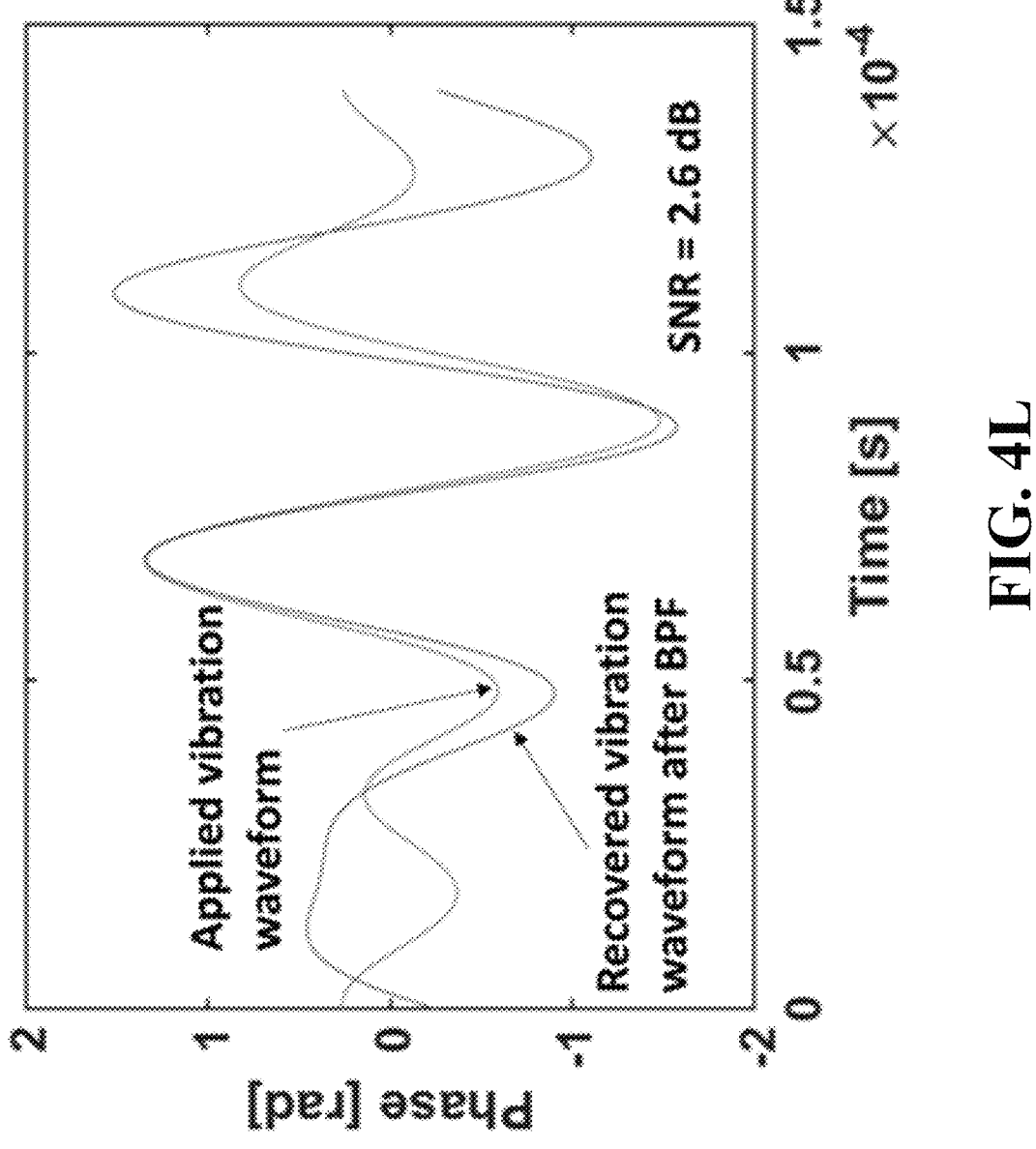
Figure 4M:
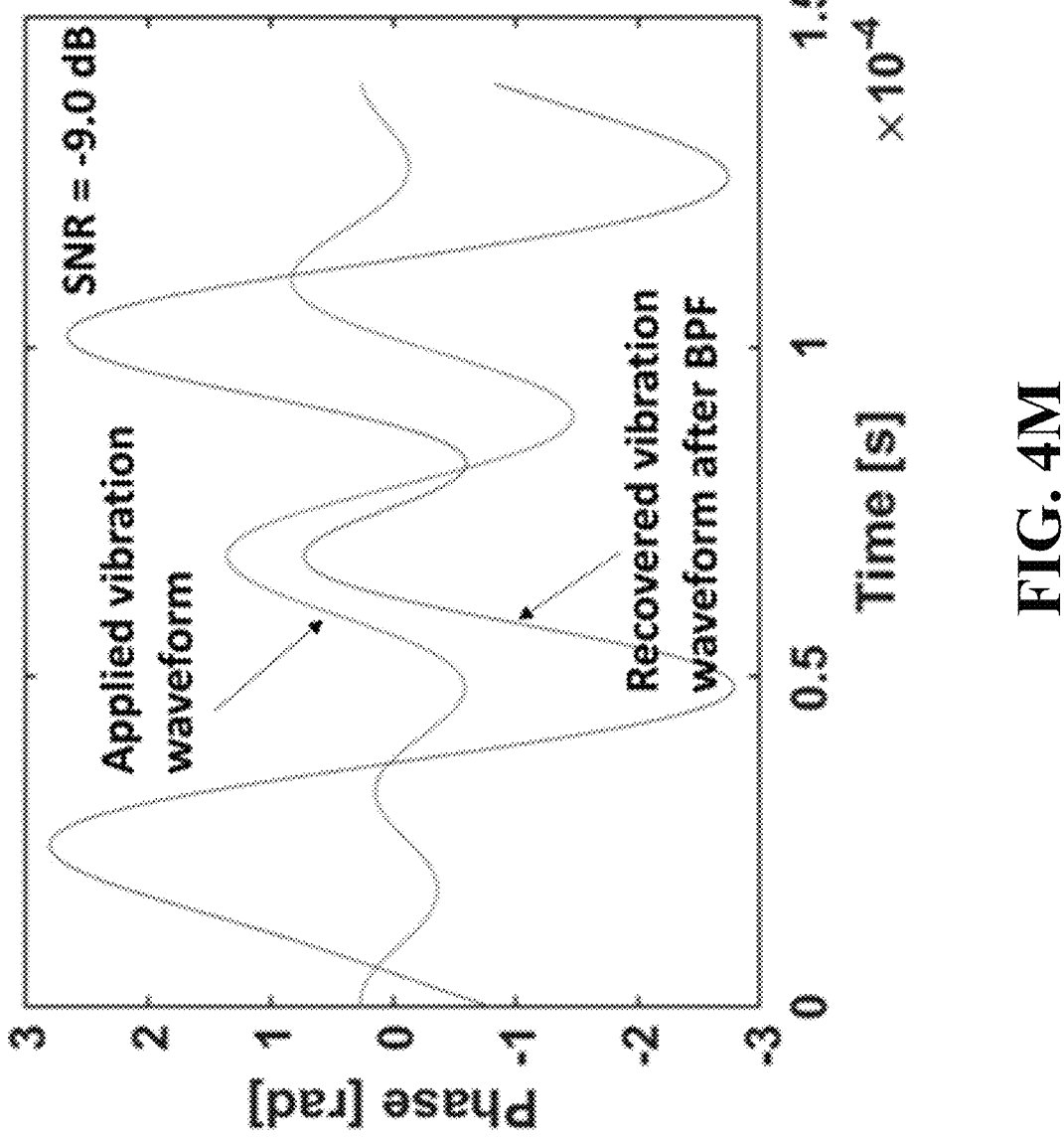
Figure 4N:
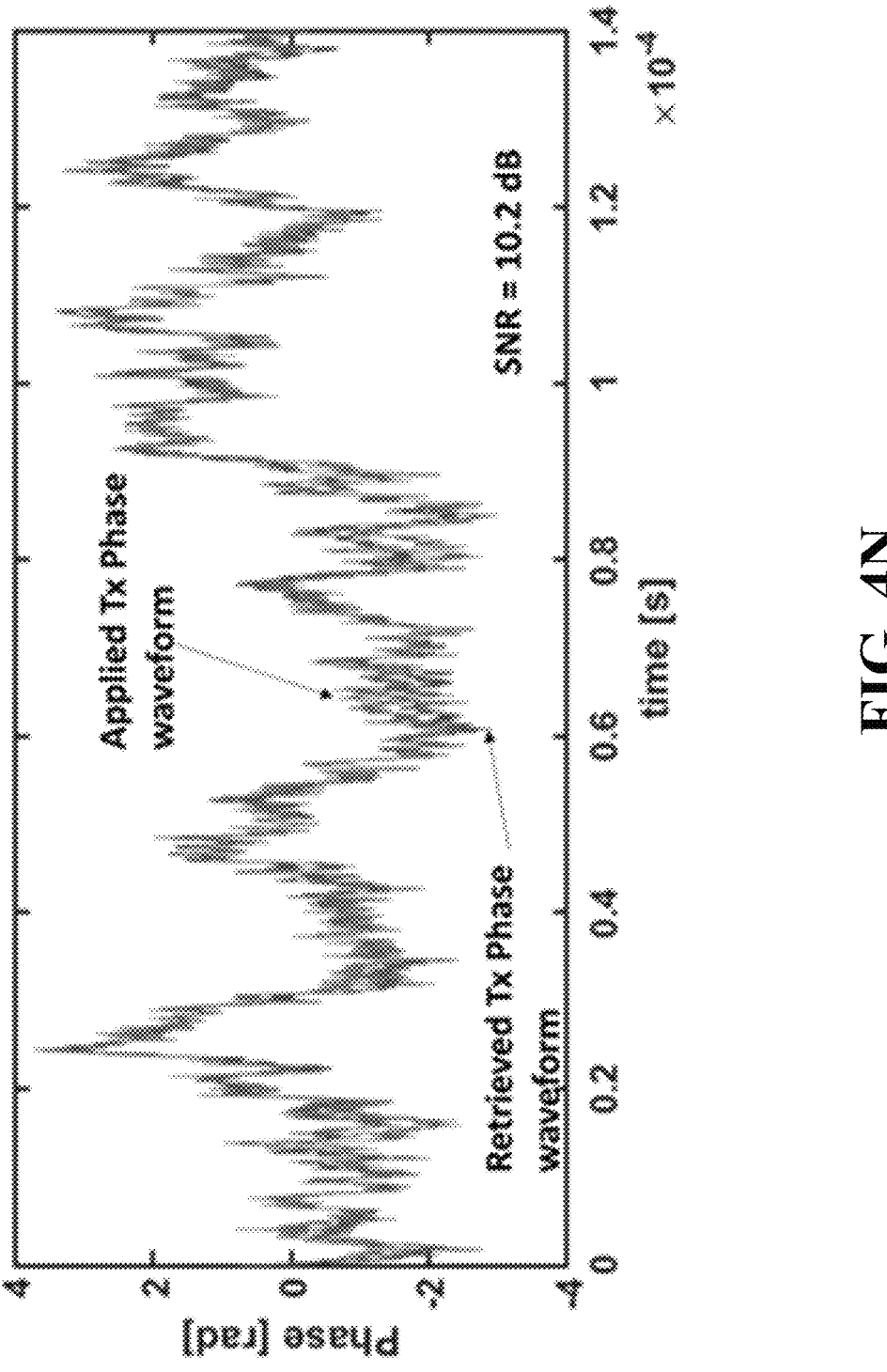
Figure 40:
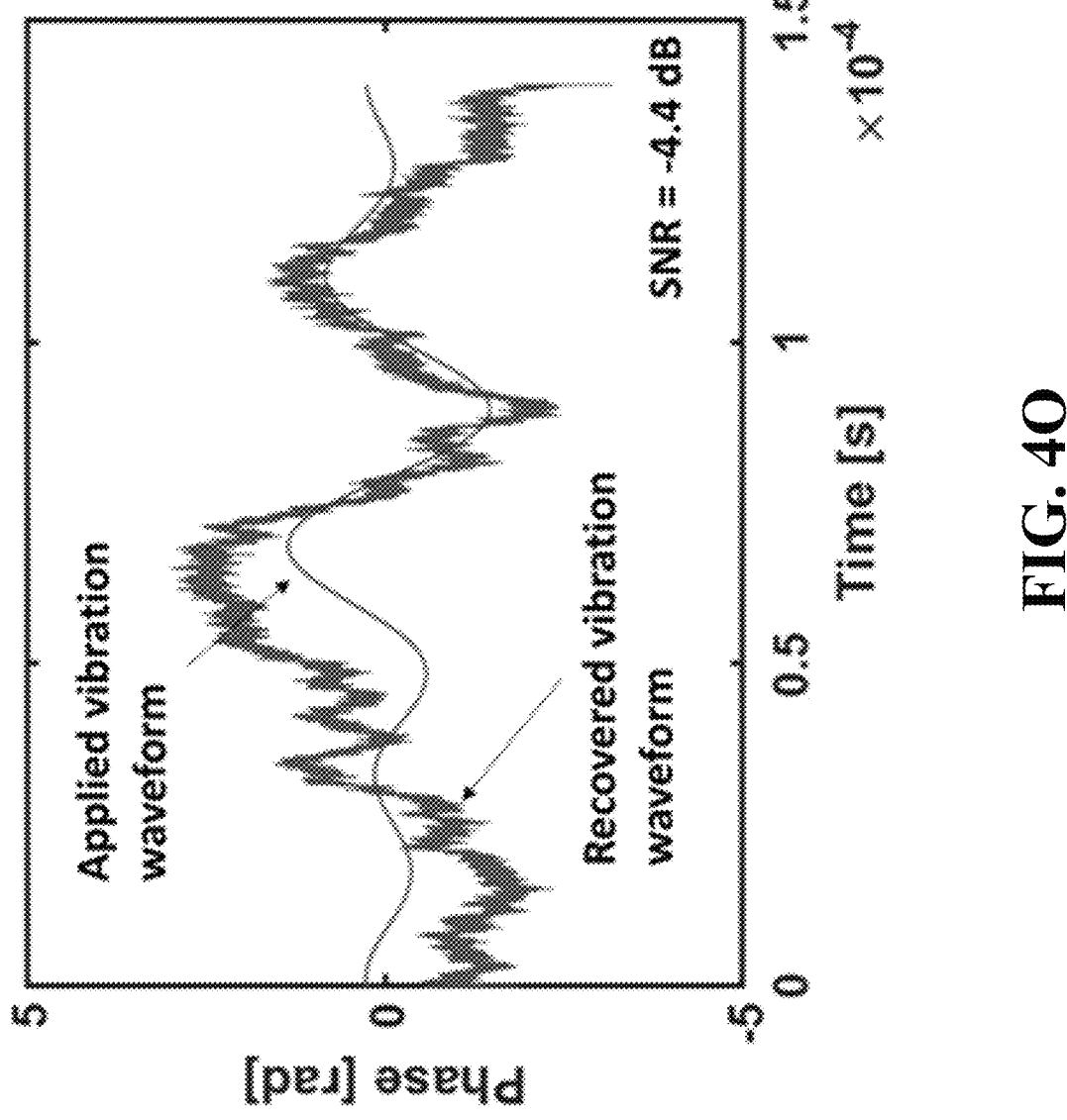
Figure 4P:
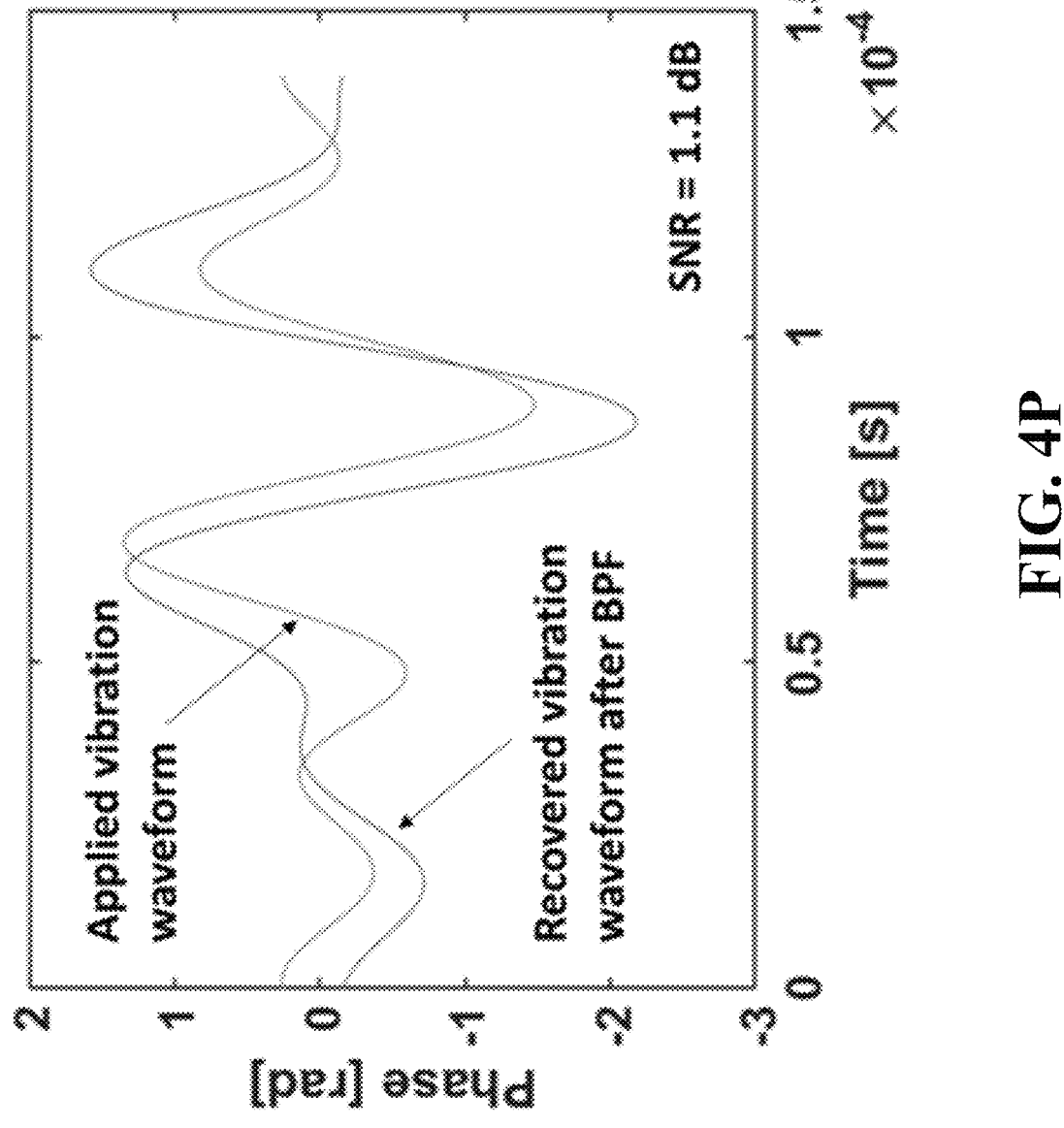
Figure 4Q:
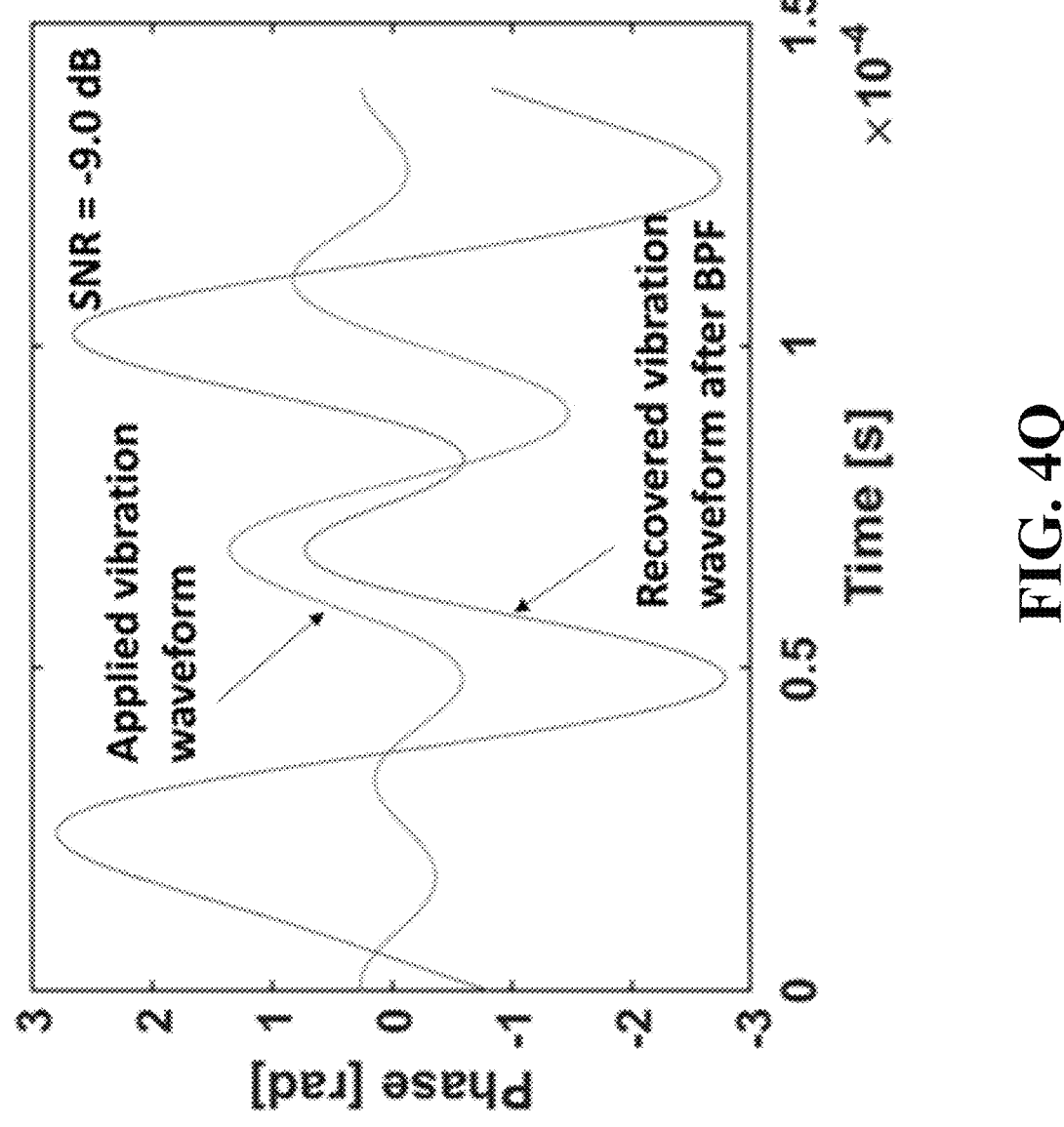

In practice, the extinction ratio of any splitting device is finite, and thus its splitting can result in some level of crosstalk. A PBS (such as the PBSs shown in FIGS. 3A and/or 4E), therefore, may exhibit polarization leakage, where some light in the X polarization may leak into the Y polarization branch and vice versa. FIGS. 4J to 4Q show simulation results that demonstrate feasibility of optically-delayed PDM at a transmitter even in the presence of leakage between two polarizations. In example simulations, after transmitter-related DSP but prior to signal output to the link (where cases included using the same modulated data for both polarizations and using different data traffic for the two polarizations), polarization leakage was emulated in the creation of each polarization—i.e., by adding 0.99 of its own complex field and 0.01 of the other polarization complex field (so as to achieve an aggressive, but realistic –20 dB level of crosstalk), resulting in partial nonorthogonality or substantial orthogonality. Although, in cases where different data traffic was used for the two polarizations, there was some observed SNR degradation in Tx phase noise estimation that depended on different random seeds, the simulation results show the viability of implementing optically-delayed PDM at a transmitter as described herein. Specifically, FIG. 4J shows the estimated laser phase noise versus an applied transmitter laser phase noise in a case of 1.7 ns/nm CD with –20 dB polarization crosstalk, FIG. 4K shows the identified or recovered vibration noise using an exemplary method of optically-delayed PDM at a transmitter versus the applied vibration for the 1.7 ns/nm CD case with –20 dB polarization crosstalk, FIG. 4L shows the identified or recovered vibration noise using an exemplary method of optically-delayed PDM at a transmitter, along with a BPF, versus the applied vibration for the 1.7 ns/nm CD case with –20 dB polarization crosstalk, and FIG. 4M shows the identified or recovered vibration noise using only a BPF versus the applied vibration for the 1.7 ns/nm CD case with −20 dB polarization crosstalk. FIG. 4N shows the estimated laser phase noise versus an applied transmitter laser phase noise in a case of 102 ns/nm CD with −20 dB polarization crosstalk, FIG. 4O shows the identified or recovered vibration noise using an exemplary method of optically-delayed PDM at a transmitter versus the applied vibration for the 102 ns/nm CD case with −20 dB polarization crosstalk, FIG. 4P shows the identified or recovered vibration noise using an exemplary method of optically-delayed PDM at a transmitter, along with a BPF, versus the applied vibration for the 102 ns/nm CD case with −20 dB polarization crosstalk, and FIG. 4Q shows the identified or recovered vibration noise using only a BPF versus the applied vibration for the 102 ns/nm CD case with −20 dB polarization crosstalk.

It is to be understood and appreciated that, although one or more of FIGS. 1, 2A, 2B, 3A, 3B, and 4A-4I might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, devices, systems, modules, etc. have been illustrated in FIGS. 1, 2A, 2B, 3A, 3B, and 4A-4I as separate components, devices, systems, modules, etc., it will be appreciated that multiple components, devices, systems, modules, etc. can be implemented as a single component, device, system, module, etc., or a single component, device, system, module, etc. can be implemented as multiple components, devices, systems, modules, etc. Additionally, functions described as being performed by one component, device, system, module, etc. may be performed by multiple components, devices, systems, modules, etc., or functions described as being performed by multiple components, devices, systems, modules, etc. may be performed by a single component, device, system, module, etc.

FIG. 5 depicts an illustrative embodiment of a method 500 in accordance with various aspects described herein.

At 502, the method can include obtaining information associated with electrical field signals, wherein the electrical field signals have been resolved based on coherent detection of time-delayed optical fields, wherein the time-delayed optical fields result from substantially orthogonal optical fields one of which has been delayed, and wherein the substantially orthogonal optical fields have been derived from an output of an optical source. For example, the receiver 4 or a central system may, similar to that described above with respect to one or more of FIGS. 3A, 3B, and 4A-4I, perform one or more operations that include obtaining information associated with electrical field signals, wherein the electrical field signals have been resolved based on coherent detection of time-delayed optical fields, wherein the time-delayed optical fields result from substantially orthogonal optical fields one of which has been delayed, and wherein the substantially orthogonal optical fields have been derived from an output of an optical source.

At 504, the method can include causing a property of the optical source to be estimated, wherein estimation of the property facilitates disturbance detection and localization. For example, the receiver 4 or a central system may, similar to that described above with respect to one or more of FIGS. 3A, 3B, and 4A-4I, perform one or more operations that include causing a property of the optical source to be estimated, wherein estimation of the property facilitates disturbance detection and localization.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
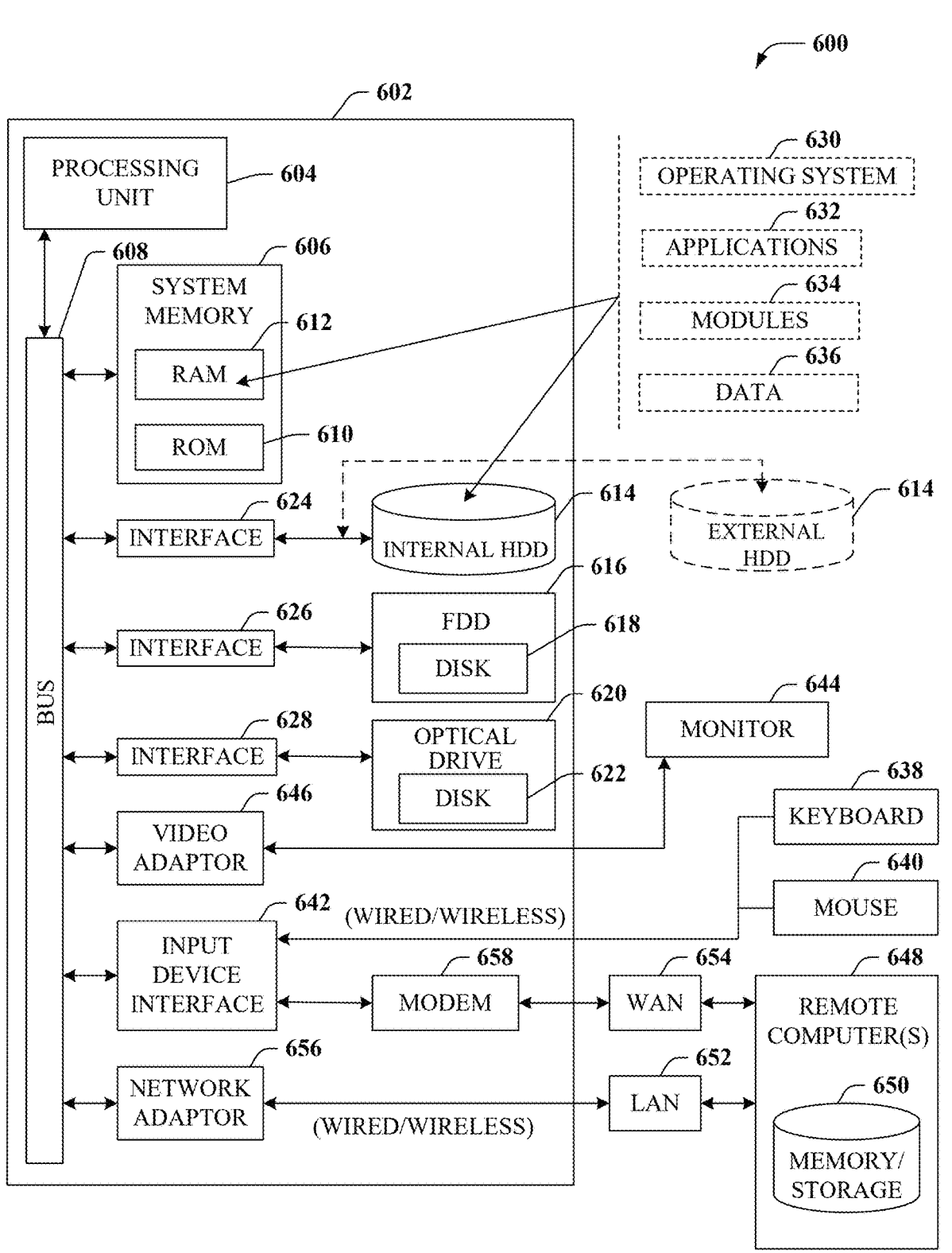
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. For example, computing environment 600 can facilitate, in whole or in part, disturbance (i.e., vibration) detection and localization in a coherent optical transmission system.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, where the two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal HDD 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high-capacity optical media such as the DVD). The HDD 614, magnetic FDD 616 and optical disk drive 620 can be connected to the system bus 608 by a hard disk drive interface 624, a magnetic disk drive interface 626 and an optical drive interface 628, respectively. The hard disk drive interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a remote memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the LAN 652 through a wired and/or wireless communication network interface or adapter 656. The adapter 656 can facilitate wired or wireless communication to the LAN 652, which can also comprise a wireless AP disposed thereon for communicating with the adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:

at least a first component configured to derive substantially orthogonal optical fields from an output of an optical source and at least a second component configured to implement a delay on one of the substantially orthogonal optical fields, resulting in time-delayed optical fields; and a receiver configured to perform coherent detection of the time-delayed optical fields to obtain electrical field signals, and cause the electrical field signals to be processed so as to estimate phase noise of the optical source, wherein estimation of the phase noise is based on independent phases of the substantially orthogonal optical fields, and wherein the estimation of the phase noise facilitates disturbance detection and localization and provides a temporal profile of phase noise values over a particular time period.

2. The system of claim 1, wherein the optical source comprises a transmitter laser or a receiver laser, and wherein the estimation of the phase noise is based on a determination of a difference between the independent phases of the substantially orthogonal optical fields according to the delay and an inverse of a transfer function of a Finite Impulse Response (FIR) filter.

3. The system of claim 1, wherein the receiver comprises a chain of Digital Signal processing (DSP) blocks that compensate for impairments of a communication channel.

4. The system of claim 1, wherein a contribution by the phase noise to a total phase is removed to determine a phase change in the remainder.

5. The system of claim 1, wherein the substantially orthogonal optical fields comprise orthogonal polarizations or orthogonal frequencies.

6. The system of claim 1, wherein the delay is on an order of nanoseconds.

7. The system of claim 1, wherein the delay is implemented at least in part in an optical domain.

8. The system of claim 1, wherein the delay is implemented at least in part in an analog domain, a digital domain, or a combination thereof.

9. The system of claim 1, wherein the receiver comprises at least one processor and a memory that stores executable instructions, and wherein the instructions, when executed by the at least one processor, cause the at least one processor to estimate the phase noise of the optical source.

10. The system of claim 1, wherein the receiver comprises one or more digital signal processing (DSP) blocks configured to utilize digital information associated with the electrical field signals to estimate the phase noise of the optical source.

11. The system of claim 1, wherein the receiver causes an external system to estimate the property phase noise.

12. The system of claim 1, wherein the receiver is equipped with carrier phase recovery (CPR) functionality.

13. The system of claim 12, wherein the CPR functionality operates based on synchronization symbols or pilot tones.

14. The system of claim 1, wherein the system comprises a bi-directional optical communication system.

15. The system of claim 1, wherein the system comprises a loop-back system.

16. A non-transitory machine-readable medium, comprising executable instructions that, when executed by a processing system including a processor, facilitate performance of operations, the operations comprising:

obtaining information associated with electrical field signals, wherein the electrical field signals have been resolved based on coherent detection of time-delayed optical fields, wherein the time-delayed optical fields result from substantially orthogonal optical fields one of which has been delayed, and wherein the substantially orthogonal optical fields have been derived from an output of an optical source; and causing phase noise of the optical source to be estimated, wherein estimation of the phase noise is based on independent phases of the substantially orthogonal optical fields, and wherein the estimation of the phase noise facilitates disturbance detection and localization and provides a temporal profile of phase noise values over a particular time period.

17. The non-transitory machine-readable medium of claim 16, wherein the optical source comprises a transmitter laser or a receiver laser, and wherein the estimation of the phase noise is based on a determination of a difference between the independent phases of the substantially orthogonal optical fields according to the delay and an inverse of a transfer function of a Finite Impulse Response (FIR) filter.

18. The non-transitory machine-readable medium of claim 16, wherein a contribution by the phase noise to a total phase is removed to determine a phase change in the remainder.

19. A method, comprising:

deriving substantially orthogonal optical fields from an output of an optical source;

implementing a delay on one of the substantially orthogonal optical fields, resulting in time-delayed optical fields;

performing coherent detection of the time-delayed optical fields;

resolving electrical field signals based on the coherent detection; and causing the electrical field signals to be processed so as to estimate a phase noise of the optical source, wherein estimation of the phase noise is based on independent phases of the substantially orthogonal optical fields, and wherein the estimation of the phase noise facilitates disturbance detection and localization and provides a temporal profile of phase noise values over a particular time period.

20. The method of claim 19, wherein the optical source comprises a transmitter laser or a receiver laser, and wherein the estimation of the phase noise is based on a determination of a difference between the independent phases of the substantially orthogonal optical fields according to the delay and an inverse of a transfer function of a Finite Impulse Response (FIR) filter.

21. A system, comprising at least a first component configured to derive substantially orthogonal optical fields from an output of an optical source and at least a second component configured to implement a delay on one of the substantially orthogonal optical fields, resulting in time-delayed optical fields that, when received at a receiver, facilitate estimation of phase noise of the optical source, wherein the estimation of the phase noise is based on independent phases of the substantially orthogonal optical fields, and wherein the estimation of the phase noise provides a temporal profile of phase noise values over a particular time period.

22. The system of claim 21, wherein the optical source comprises a transmitter laser or a receiver laser.

* * * * *